(12) United States Patent
Krause et al.

(10) Patent No.: US 12,209,965 B2
(45) Date of Patent: Jan. 28, 2025

(54) METHOD OF DETECTING PRESENCES OF DIFFERENT ANTINUCLEAR ANTIBODY FLUORESCENCE PATTERN TYPES WITHOUT COUNTERSTAINING AND APPARATUS THEREFOR

(71) Applicant: EUROIMMUN Medizinische Labordiagnostika AG, Lübeck (DE)

(72) Inventors: Christopher Krause, Büchen (DE); Jens Krauth, Lübeck (DE); Stefan Gerlach, Groß Groenau (DE); Christian Marzahl, Erlangen (DE); Melanie Hahn, Stockelsdorf (DE); Joern Voigt, Lübeck (DE)

(73) Assignee: EUROIMMUN Medizinische Labordiagnostika AG, Lübeck (DE)

( * ) Notice: Subject to any disclaimer, the term of this patent is extended or adjusted under 35 U.S.C. 154(b) by 242 days.

(21) Appl. No.: 17/579,578

(22) Filed: Jan. 19, 2022

(65) Prior Publication Data
US 2022/0228989 A1    Jul. 21, 2022

(30) Foreign Application Priority Data
Jan. 19, 2021   (EP) .................................... 21152396

(51) Int. Cl.
*G06T 7/11*     (2017.01)
*G01N 21/64*    (2006.01)
(Continued)

(52) U.S. Cl.
CPC ..... *G01N 21/6456* (2013.01); *G01N 21/6428* (2013.01); *G06N 3/04* (2013.01);
(Continued)

(58) Field of Classification Search
None
See application file for complete search history.

(56) References Cited

U.S. PATENT DOCUMENTS 11,367,187 B2 * 6/2022 Krauth ................ G06T 7/11
2002/0186874 A1 * 12/2002 Price ................... G01N 15/147
382/173

(Continued)

OTHER PUBLICATIONS

Bayramoglu et al., Human Epithelial Type 2 Cell Classification with Convolutional Neural Networks, 2015 IEEE 15th International Conference on Bioinformatics and Bioengineering (BIBE), 2015, IEEE, pp. 1-6.

(Continued)

*Primary Examiner* — Tsung Yin Tsai
(74) *Attorney, Agent, or Firm* — Bochner PLLC; Andrew Bochner

(57) ABSTRACT

A method and apparatus are provided for detecting respective potential presences of respective different cellular fluorescence pattern types on a biological cellular substrate including human epithelioma cells (HEp cells), wherein the fluorescence pattern types include different antinuclear antibody fluorescence pattern types. A method is also provided for detecting potential presences of different cellular fluorescence pattern types on a biological cellular substrate including human epithelioma cells by means of digital image processing, as well as a computing unit, a data network device, a computer program product and a data carrier signal therefor.

13 Claims, 24 Drawing Sheets

(51) Int. Cl.
*G06N 3/04* (2023.01)
*G06T 7/00* (2017.01)

(52) U.S. Cl.
CPC .............. *G06T 7/0012* (2013.01); *G06T 7/11* (2017.01); *G01N 2021/6439* (2013.01); *G06T 2207/10064* (2013.01); *G06T 2207/30024* (2013.01)

(56) References Cited

U.S. PATENT DOCUMENTS

| | | | | |
|---|---|---|---|---|
| 2003/0092040 | A1* | 5/2003 | Bader | G16B 20/00 702/20 |
| 2010/0047811 | A1* | 2/2010 | Winfried | G06T 7/90 435/7.1 |
| 2019/0333197 | A1* | 10/2019 | Kask | G06T 5/40 |
| 2020/0300764 | A1 | 9/2020 | Gerlach et al. | |
| 2021/0019883 | A1* | 1/2021 | Krauth | G06T 7/70 |

OTHER PUBLICATIONS

Cascio et al., Deep CNN for IIF Images Classification in Autoimmune Diagnostics, Applied Sciences, 2019, Bd. 9, Nr. 8, p. 1618.
Foggia et al., Benchmarking HEp-2 Cells Classification Methods, IEEE Transactions on Medical Imaging, 2013, IEEE Service Center, Piscataway, NJ, US, Bd. 32, No. 10, pp. 1878-1889.
Gupta et al., A CNN based HEp-2 Specimen Image Segmentation and Identification of Mitotic Spindle Type Specimens, Advances in databases and information systems, Lecture Notes in computer science, Springer International Publ., 2019, CHAM, pp. 564-575.

* cited by examiner

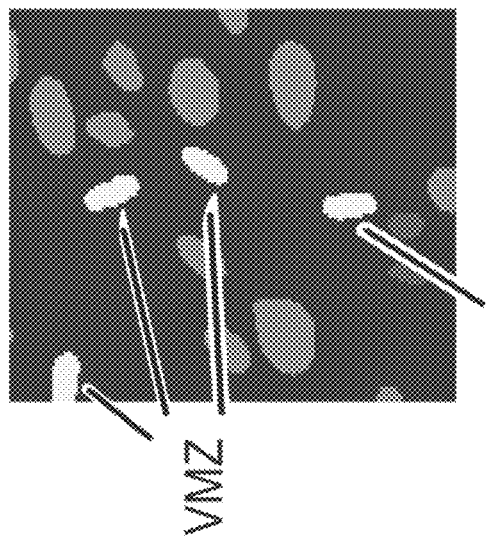
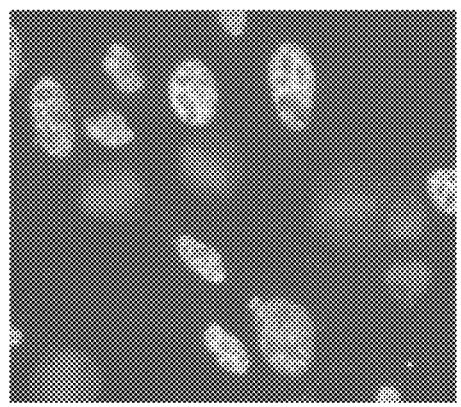
Fig.12

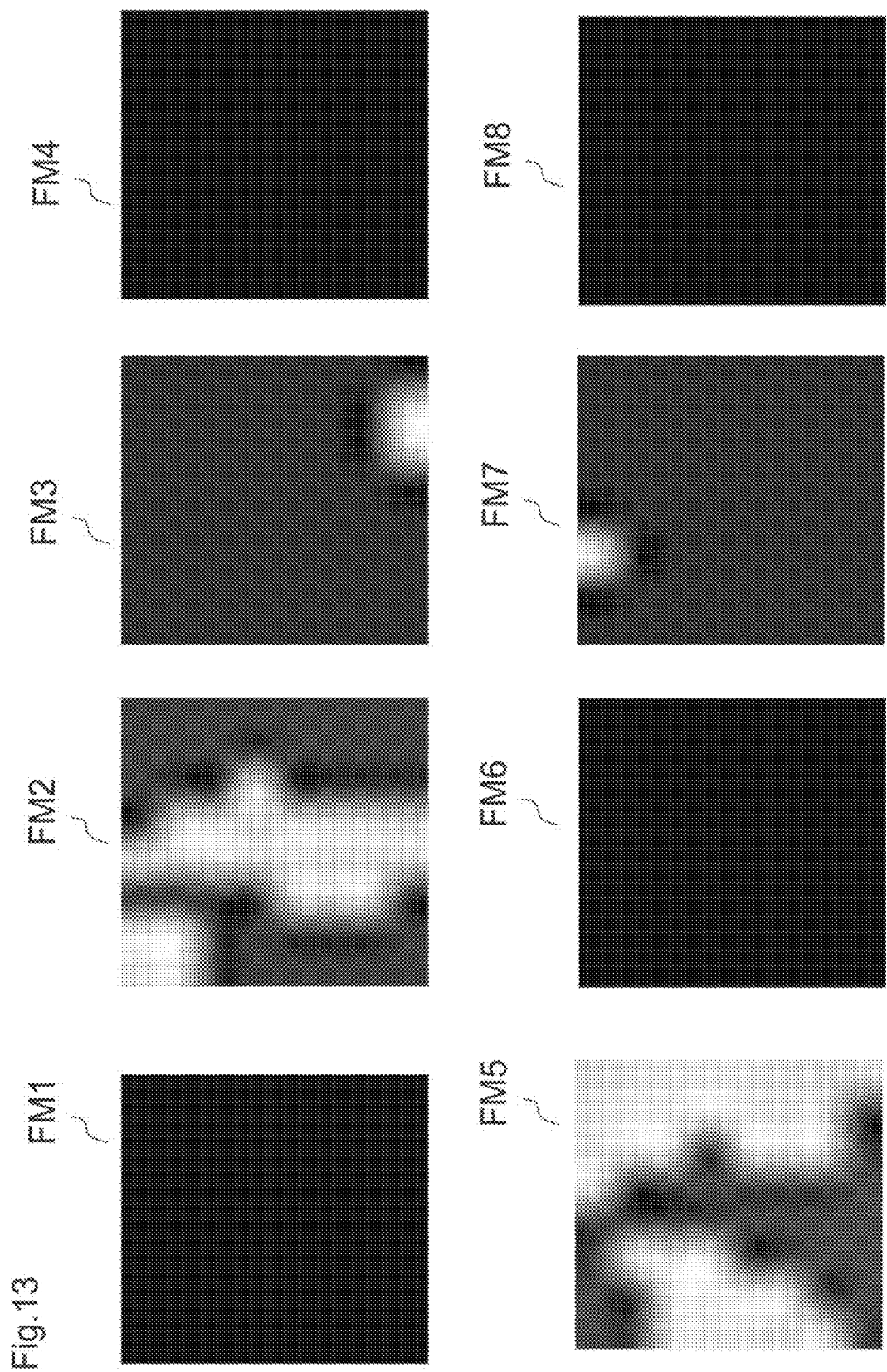

FBX

FBS

Fig. 22

| Pattern | TA | FA | TR | FR | Sens | Spec | Overall | Number |
|---|---|---|---|---|---|---|---|---|
| AC-1; n=2 | 38 | 9 | 326 | 12 | 0.76 | 0.9731343 | 0.94545455 | 385 |
| AC-2; n=4 | 22 | 3 | 360 | 0 | 1 | 0.99173554 | 0.99220779 | 385 |
| AC-3; n=3 | 22 | 0 | 363 | 0 | 1 | 1 | 1 | 385 |
| Nuclear dots (AC-6,7); n=6 | 21 | 6 | 354 | 4 | 0.84 | 0.98333333 | 0.97402597 | 385 |
| Granular; n=5 | 81 | 37 | 259 | 8 | 0.91011236 | 0.875 | 0.88311688 | 385 |
| Nuclear envelope (AC-11,12); n=8 | 25 | 3 | 356 | 1 | 0.96153846 | 0.99164345 | 0.98961039 | 385 |
| Negative (AC-0); n=1 | 113 | 8 | 238 | 26 | 0.81294964 | 0.96747967 | 0.91168831 | 385 |
| Nucleolar (AC-8,9,10); n=7 | 24 | 5 | 356 | 0 | 1 | 0.98614958 | 0.98701299 | 385 |

METHOD OF DETECTING PRESENCES OF DIFFERENT ANTINUCLEAR ANTIBODY FLUORESCENCE PATTERN TYPES WITHOUT COUNTERSTAINING AND APPARATUS THEREFOR

CROSS-REFERENCE TO RELATED APPLICATIONS

The present application claims priority pursuant to 35 U.S.C. § 119(a) to EP patent application 21152396.4, filed Jan. 19, 2021, which is incorporated by reference herein in its entirety.

BACKGROUND

The invention relates to a method and an apparatus for detecting respective potential presences of respective different cellular fluorescence pattern types on a biological cellular substrate comprising human epithelioma cells (HEp cells), wherein the fluorescence pattern types comprise different antinuclear antibody fluorescence pattern types. The invention further relates to a method for detecting potential presences of different cellular fluorescence pattern types on a biological cellular substrate comprising human epithelioma cells by means of digital image processing and to a computing unit, a data network device, a computer program product and a data carrier signal therefor.

For the purposes of medical diagnostics and especially for the purposes of detecting autoantibodies in a liquid patient sample such as, for example, blood or blood serum, it is a known method to incubate a biological substrate comprising human epithelioma cells with the liquid patient sample or else the diluted liquid patient sample. Depending on a presence of certain primary autoantibodies in the patient sample, what arises is binding of said primary antibodies in different regions of said cells. The biological cellular substrate is then furthermore incubated with secondary antibodies which have been labelled with a so-called fluorescent dye. Such secondary antibodies can, in turn, bind to the primary antibodies bound on the cellular substrate. Irradiation of the substrate with excitation radiation then yields a fluorescence of said fluorescent dye, and so, in a corresponding fluorescence image, the primary antibodies of the patient sample which have bound to the cells of the cellular substrate and to which, in turn, secondary antibodies containing the fluorescent dye have bound can then be localized as a fluorescence pattern. Different specific fluorescence patterns arise depending on a disease of the patient or a presence of specific primary antibodies in the patient sample. In the case of such detection of primary antibodies as so-called autoantibodies which are directed against the cell nuclei or the antigens of the cell nucleus, what thus arise here are so-called antinuclear antibody fluorescence patterns. They are also termed so-called ANA fluorescence patterns or ANA pattern.

The naming of such autoantigens was determined either by biochemical features (DNA, histones, ribonucleoproteins: RNP), or by diseases associated with the autoantibodies.

In the course of indirect immunofluorescence (IIFT) with human epithelial cells or human epithelioma cells, what thus arises is the task of identifying and classifying the resultant different fluorescence pattern types. Here, a single pattern on its own need not necessarily be present in a fluorescence image; instead, multiple patterns can also be present at the same time.

Antibodies against nuclear antigens are directed against various constituents of the cell nucleus (biochemical substances of the cell nucleus). They encompass nucleic acids, nuclear proteins and ribonucleoproteins.

The different resultant antinuclear antibody fluorescence pattern types are differentiated into different pattern types. One approach to this end can be found on the Internet site www.anapatterns.org, on which, inter alia, different nuclear patterns are listed and differentiated. An exemplary classification according to this scheme is illustrated in FIG. 18.

SUMMARY

It is an object of the present invention to provide, by means of digital image processing, a method which automatically detects respective potential presences of respective different antinuclear antibody fluorescence pattern types in a fluorescence image. The object of the invention is achieved by the methods, apparatuses, computing units, data network devices, computer program products and data carrier signals disclosed herein.

There is proposed a method for detecting respective potential presences of respective different cellular fluorescence pattern types on a biological cellular substrate comprising human epithelioma cells, wherein the cellular fluorescence pattern types comprise a plurality of different antinuclear antibody fluorescence pattern types. The method comprises different steps. What takes place is incubation of the cellular substrate with a liquid patient sample which potentially comprises primary antibodies. Preferably, the liquid patient sample is diluted patient blood, particularly preferably diluted blood serum of the patient. The cellular substrate is incubated with secondary antibodies which have been labelled with a fluorescent dye. What further takes places is preferably irradiation of the cellular substrate with excitation radiation. What further takes place is acquisition of a total image which represents staining of the cellular substrate due to the fluorescent dye.

What further takes place is determination of a segmented image by means of segmentation of the total image, preferably by means of a separate and pretrained convolutional neural network for said segmentation. In particular, the segmented image comprises at least one segment class which represents a valid mitosis cell, preferably a mitosis cell in a metaphase stage, particularly preferably a metaphase plate of a mitosis cell in a metaphase stage.

What further takes place in the method according to the invention is detection in the segmented image of respective image segments which each represent a mitotic cell. Preferably, such an image segment indicates a mitotic cell or mitosis cell. Particularly preferably, such an image segment indicates a mitosis cell in a so-called metaphase stage. Very particularly preferably, such an image segment indicates a metaphase plate of a mitosis cell in a so-called metaphase stage. As a result of such an image segment particularly preferably indicating a metaphase plate, mitosis cells in the metaphase stage can be detected particularly easily.

What then further takes place is selection of sub-images of the total image which each comprise at least one mitotic cell, especially a valid mitotic cell, and of corresponding sub-images of the segmented image on the basis of the detected image segments. What further takes place is, lastly, detection of respective actual presences of the respective cellular fluorescence pattern types by means of a pretrained convolutional neural network on the basis of the selected sub-images of the total image and the selected sub-images of the segmented image.

In particular, the convolutional neural network processes, in each case, a tuple of sub-images at the same time, wherein such a tuple comprises at least one selected sub-image of the total image and a corresponding selected sub-image of the segmented image.

The total image represents, in particular, staining of the cellular substrate due to the fluorescent dye in the form of a green fluorescent dye.

More detailed explanations will now be provided to elucidate one or more possible advantages of the method according to the invention.

The secondary antibodies can bind to those primary antibodies which originate from the liquid patient sample and have bound to specific regions of the cellular substrate or the cell nucleus, and so, depending on the presence of respective different types of primary antibodies, respective different antibody fluorescence patterns can be present in the total image and then be identified. To detect different ANA patterns, it would be possible in principle to analyze an entire fluorescence image or the total image comprising the vast majority of human epithelioma cells (HEp cells) by means of a convolutional neural network and thus, for identification of the different ANA patterns, to supply the convolutional neural network with such an entire fluorescence image for detection of the respective presences of the respective fluorescence pattern types. The convolutional neural network (CNN) would then have to evaluate the entirety of all the HEp cells of the image together or at once in order to identify the different antinuclear antibody fluorescence pattern types. For accurate detection, it is advantageous for statistical reasons to consider as many HEp cells as possible. However, there are also various disadvantages here. Firstly, computing overhead for processing of an entire fluorescence image comprising the vast majority of HEp cells would be very high. Furthermore, processing such a large total image comprising very many HEp cells would constitute a high degree of freedom of abstract image information. If the convolutional neural network were to be trained with such large entire fluorescence images during a training phase, the set and the variation of abstract image information would possibly be too great for the convolutional neural network to sufficiently converge in the training phase to a state to allow reliable detection of different fluorescence pattern types or fluorescence pattern classes.

Therefore, according to the invention, it is proposed that the total image is first segmented in order to obtain a segmented image, since such a segmented image depicts or indicates general positions of cellular structures or general cellular regions in the total image. On the basis of the segmented image, what can then first be detected are certain image segments which each represent or indicate a mitotic cell, preferably mitotic cells of a certain stage of mitosis. Particularly preferably, such an image segment indicates a mitosis cell in a so-called metaphase stage. Very particularly preferably, such an image segment indicates a metaphase plate of a mitosis cell in a so-called metaphase stage.

What can then be selected are those sub-images of the segmented image and the total image which each comprise at least one mitotic cell, especially at least one mitosis cell in the metaphase stage in each case. Here, in particular, the image segments are smaller than the sub-images in terms of their spatial extent.

This gives rise to the advantage that the convolutional neural network has to process, in each case, only one sub-image of the total image having antibody-specific fluorescent dye staining and the corresponding sub-image of the segmented image, and not the total image at once. Therefore, the convolutional neural network can be trained on one size of such sub-images and need evaluate only those sub-images having a limited number of HEp cells and thus only a limited set of abstract image information.

In the method according to the invention, the convolutional neural network processes, together or simultaneously, the selected sub-image of the total image which has patient-specific staining with the fluorescent dye, and also a corresponding sub-image of the segmented image which represents a depiction of the cellular substrate to highlight general cellular structures. As a result, the convolutional neural network can, by means of the sub-image of the segmented image, focus on localization information based on cellular regions or cellular structures which are indicated in the segmented sub-image, and simultaneously also detect the actual patient-specific fluorescence patterns in the sub-images of the total image. In other words: the sub-image of the segmented image helps the convolutional neural network to focus on respective regions of cells or cellular structures characteristic of respective pattern types when analyzing the sub-image of the total image.

What are known from the prior art are methods in which the cellular substrate can be stained with a further fluorescent dye, preferably by means of propidium iodide as fluorescent dye or indicator dye for staining in a red channel. Such an indicator dye binds to cellular regions non-specifically, unaffected by a presence of primary antibodies in a patient sample, and thus allows in-principle identification or indication of different cellular regions in a fluorescence image of a red channel. In other words: such optional and additional staining of the cellular substrate in a red color channel can make it possible to visualize relatively large or general cellular regions or cellular structures, and so such structures can then be identified or detected in the red-channel image.

However, the method proposed here manages without such optional, additional staining of the substrate by an indicator dye; instead, it requires only the one fluorescence total image of the one fluorescent dye, preferably a green fluorescent dye, as input information in order to detect respective actual presences of the respective cellular fluorescence pattern types. Particularly advantageously, instead of an indicator-dye image or a red-channel image, the proposed method uses other image information instead, namely the segmented image derived from the total image having patient-specific staining, and then uses sub-images of the total image and the segmented image that correspond to one another for detection of respective actual presences of the respective cellular fluorescence pattern types by means of the convolutional neural network.

The problem of providing further image information comprising generally stained or indicated cellular structures in addition to the image information of the total image was solved in the prior art precisely by the necessity of using an indicator dye, whereas, according to the invention, this necessity is instead now not applicable and the segmented image derived from the total image, which is green in particular, is used.

Preferably, the segmentation of the total image to determine the segmented image is done by means of a network separate from the hitherto mentioned convolutional neural network, especially by means of a further separate and pretrained convolutional neural network. The inventors have recognized that the use of a separate convolutional neural network for segmentation instead of classic image-processing methods, for example Otsu's thresholding method, can achieve distinctly more reliable segmentation results. The total image having pattern-specific staining sometimes comprises two individual staining pattern types for a so-called positive patient, with up to n=8 different pattern types being possible for example, but this is not known prior to segmentation, and so it is not certain which of the n=8 potential pattern types are exactly present in the total image, and so the segmentation algorithm must identify general cellular structures independently of pattern types present in a patient-specific manner. Assuming for example without any loss of generality that there are n=8 different pattern types and that k=2 pattern types are always present in a positive total image, then for combinational reasons the result is $$\binom{n}{k} = \frac{n!}{(n-k)!\,k!}$$

different combinations, with n=8 and k=2 in this case, i.e. 28 different patient-specific pattern stainings which must be caught by the segmentation algorithm in order to reliably find the general cellular structures. This can be achieved only with difficulty by classic image-processing algorithms with customary feature extraction, since features to be extracted must be individually designed and 28 pattern combinations would thus have to be caught here. Because, according to the invention, the separate convolutional neural network is used for segmentation, the separate convolutional neural network can be trained in advance with different total images of the different combinations of pattern types for the task of segmentation of the total image.

Advantageous embodiments of the invention are subject matter of the dependent claims and are more particularly elucidated in the following description with some reference to the figure.

Preferably, what are detected are those image segments which each represent a valid mitotic cell in the segmented image by said respective image segments indicating respective metaphase plates of respective mitosis cells in a metaphase stage.

Preferably, the method further comprises: detecting in the total image, on the basis of the segmented image, respective image segments which each represent a mitotic cell of sufficient quality, and selecting sub-images of the total image and corresponding sub-images of the segmented image on the basis of the detected image segments which each represent at least one mitotic cell of sufficient quality.

Preferably, the method further comprises: determining respective measures of confidence for the respective actual presences of the respective fluorescence pattern types by means of the convolutional neural network on the basis of the selected sub-images of the total image and the selected sub-images of the segmented image.

Preferably, the convolutional neural network comprises an output layer which generates a respective feature map for a respective cellular fluorescence pattern type, wherein the convolutional neural network determines a respective measure of confidence on the basis of a respective feature map.

Preferably, the method further comprises: segmenting the total image into image segments of different segment classes, determining at least one brightness value for at least one fluorescence pattern type on the basis of one or more image segments of at least one particular segment class, and verifying the measure of confidence of the at least one fluorescence pattern type on the basis of the brightness value of the at least one fluorescence pattern type.

Preferably, the verification of the measure of confidence is done on the basis of the brightness value and depending on a threshold value specifiable by a user.

Preferably, the method further comprises, for a respective sub-image tuple which comprises a sub-image of the total image and a corresponding sub-image of the segmented image, determining respective sub-image measures of confidence for respective actual sub-image presences of respective cellular fluorescence pattern types by means of the convolutional neural network, and determining the respective measures of confidence for the respective actual presences of the respective fluorescence pattern types on the basis of the sub-image measures of confidence.

Preferably, the method further comprises: dividing the total image into a set of sub-images according to a specified dividing scheme, selecting sub-images of the total image on the basis of the detected image segments and selecting corresponding sub-images of the segmented image, and detecting respective actual presences of the respective cellular fluorescence pattern types by means of the convolutional neural network on the basis of the selected sub-images of the total image and on the basis of the selected sub-images of the segmented image.

There is further proposed an apparatus according to the invention for detecting respective potential presences of respective different cellular fluorescence pattern types on a biological cellular substrate comprising human epithelioma cells by means of digital image processing. The apparatus comprises: a holding device for the biological substrate, which was incubated with a liquid patient sample which potentially comprises primary antibodies and, furthermore, with secondary antibodies which have been labelled with a fluorescent dye. The apparatus further comprises at least one image acquisition unit for acquiring a total image which represents staining of the cellular substrate due to the fluorescent dye. The apparatus is characterized by at least one computing unit designed to determine a segmented image by means of segmentation of the total image, to detect in the segmented image respective image segments which each represent a mitotic cell, to select sub-images of the total image which each comprise at least one mitotic cell and corresponding sub-images of the segmented image on the basis of the detected image segments, and to detect respective actual presences of the respective cellular fluorescence pattern types by means of a convolutional neural network on the basis of the selected sub-images of the total image and the selected sub-images of the segmented image.

There is further proposed a method for detecting respective potential presences of respective different cellular fluorescence pattern types on a biological cellular substrate comprising human epithelioma cells by means of digital image processing. The method comprises: acquiring a total image which represents staining of the cellular substrate due to the fluorescent dye, determining a segmented image by means of segmentation of the total image, detecting in the segmented image respective image segments which each represent a mitotic cell, selecting sub-images of the total image which each comprise at least one mitotic cell and corresponding sub-images of the segmented image on the basis of the detected image segments, and detecting respective actual presences of the respective cellular fluorescence pattern types by means of a convolutional neural network on the basis of the selected sub-images of the total image and the selected sub-images of the segmented image.

There is further proposed a method for digital image processing. The method comprises: receiving a total image which represents staining of a biological cellular substrate due to a fluorescent dye, wherein the biological cellular substrate comprises human epithelioma cells, determining a segmented image by means of segmentation of the total image, detecting in the segmented image respective image segments which each represent a mitotic cell, selecting sub-images of the total image which each comprise at least one mitotic cell and corresponding sub-images of the segmented image on the basis of the detected image segments, and detecting respective actual presences of the respective cellular fluorescence pattern types by means of a convolutional neural network on the basis of the selected sub-images of the total image and the selected sub-images of the segmented image.

There is further proposed a computing unit which, in the course of digital image processing, is designed to receive a total image which represents staining of a biological cellular substrate due to a fluorescent dye, wherein the biological cellular substrate comprises human epithelioma cells, to determine a segmented image by means of segmentation of the total image, to detect in the segmented image respective image segments which each represent a mitotic cell, to select sub-images of the total image which each comprise at least one mitotic cell and corresponding sub-images of the segmented image on the basis of the detected image segments, and to detect respective actual presences of the respective cellular fluorescence pattern types by means of a convolutional neural network (CNN2) on the basis of the selected sub-images of the total image and the selected sub-images of the segmented image.

There is further proposed a data network device comprising at least one data interface for receiving a total image which represents staining of a biological cellular substrate due to a fluorescent dye, wherein the biological cellular substrate comprises human epithelioma cells, and also a computing unit according to the invention as described above.

There is further proposed a computer program product comprising commands which, upon execution of the program by a computer, prompt said computer to carry out the method for digital image processing according to the invention.

There is further proposed a data carrier signal which transmits the computer program product.

BRIEF DESCRIPTION OF THE DRAWINGS

In what follows, the invention will be more particularly elucidated on the basis of specific embodiments without restricting the general concept of the invention, with reference to the figures, where:

FIG. 12 shows a sub-image of the total image and a corresponding sub-image of the segmented image, FIG. 13 shows different feature maps for different fluorescence pattern types or fluorescence pattern classes based on the sub-image from FIG. 12, FIG. 22 shows experimental results of one example.

DETAILED DESCRIPTION

Figure 8:
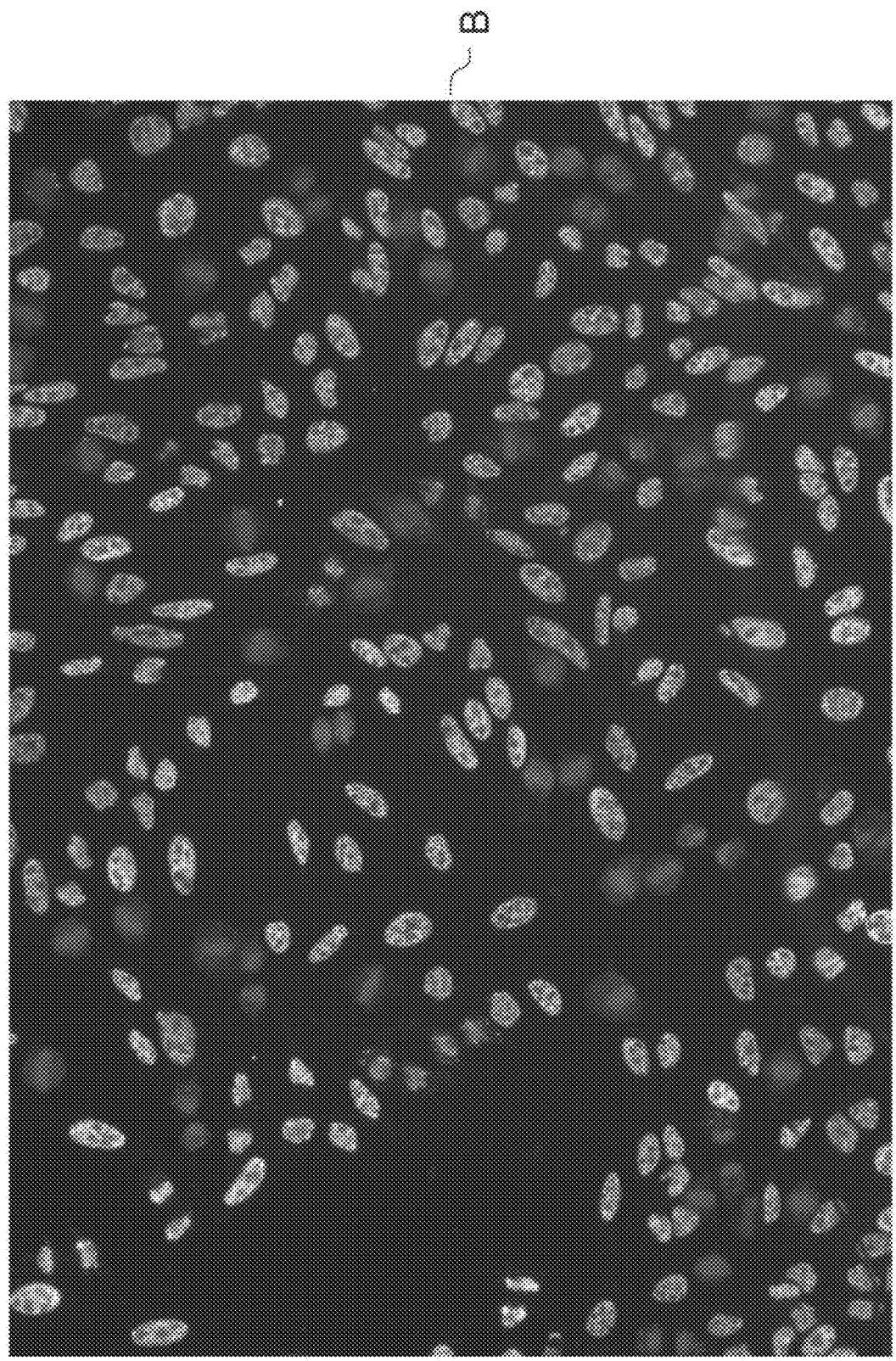
FIG. 8 shows a total image or an entire fluorescence image.

FIG. 8 shows a total image or fluorescence pattern image B having grey staining which represents staining of a cellular substrate in a so-called green channel due to a fluorescent dye.

Because of incubation of the cellular substrate, as depicted here, with a diluted patient-specific blood serum and resultant binding of primary autoantibodies, further incubation of the cellular substrate with secondary antibodies which have been labelled with the fluorescent dye leads to staining in a green channel. The fluorescent dye is preferably fluorescein isothiocyanate (FITC).

It allows differentiated pattern-type staining of cellular regions in the image B and differentiated identification of a presence of antinuclear fluorescence pattern types. In the image B from FIG. 8, there does not necessarily have to be only a single stained pattern or a single antinuclear antibody fluorescence pattern of a particular pattern type; a plurality of such antinuclear antibody fluorescence pattern types can also occur at the same time.

Figure 6:
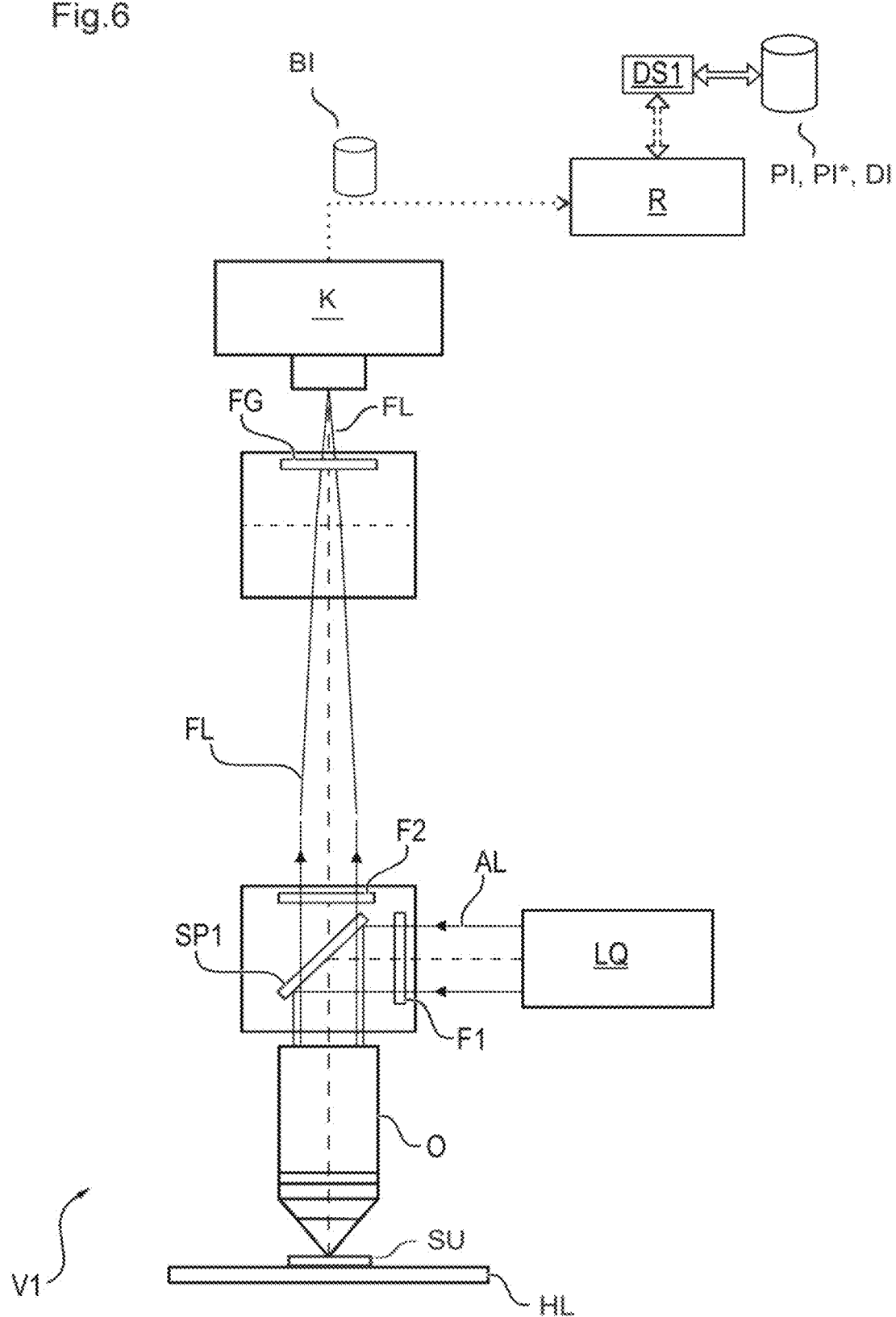
FIG. 6 shows a proposed apparatus as per a preferred embodiment.

The image B can be acquired by means of an image acquisition unit in the form of a camera K of an apparatus V1 from FIG. 6.

Figure 9:
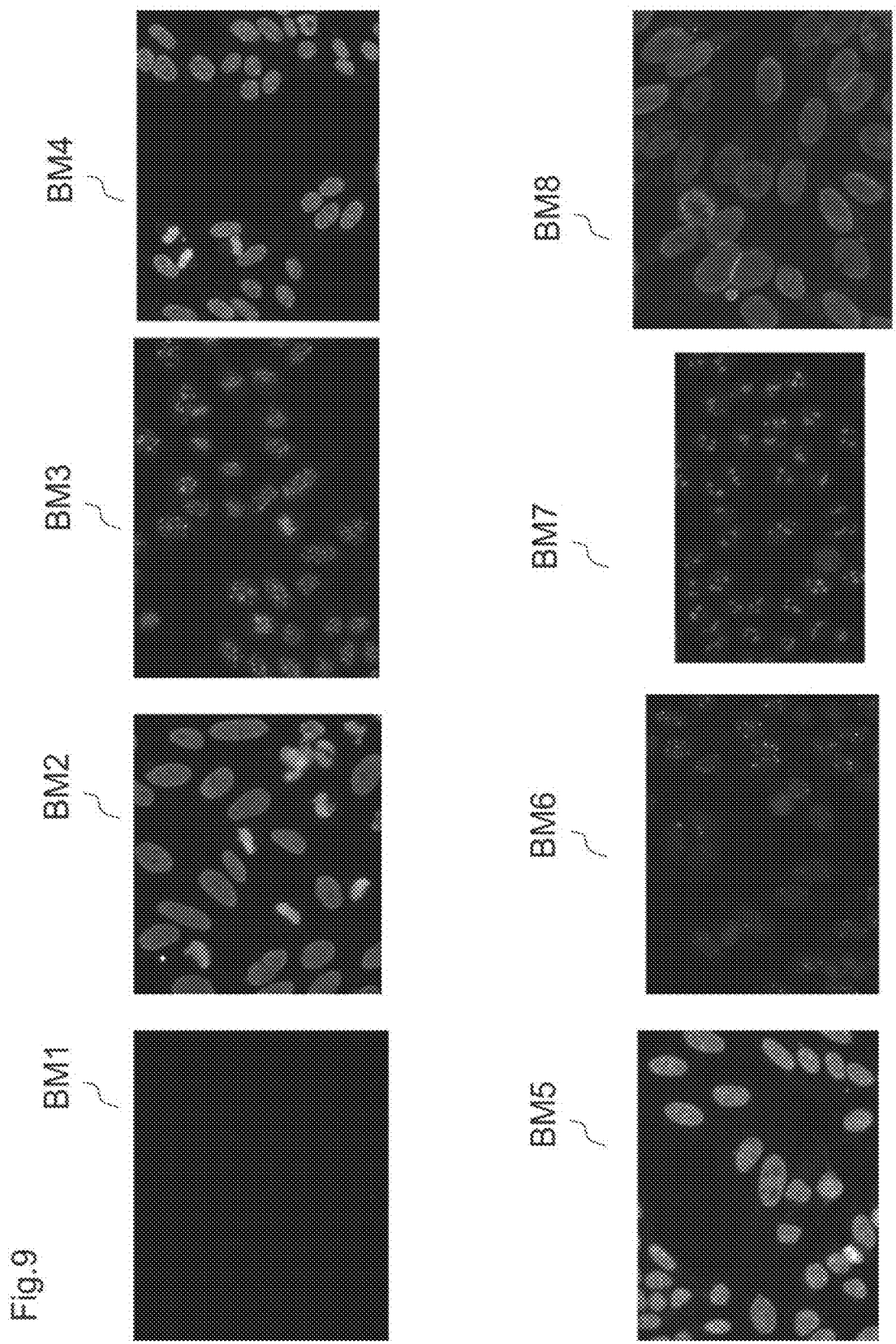
FIG. 9 shows different exemplary antinuclear antibody fluorescence pattern types.

FIG. 9 shows different antinuclear antibody fluorescence pattern types BM1, . . . , BM8. The pattern type BM1 constitutes so-called negative staining, in the event of none of the other antinuclear antibody fluorescence pattern types to be detected being present. This corresponds to the pattern AC-0 from FIG. 18 having the pattern index n=1 used by way of example here. The exemplary pattern classification from FIG. 18 comes from the source www.anapatterns.org/trees-full.php.

Figure 18:
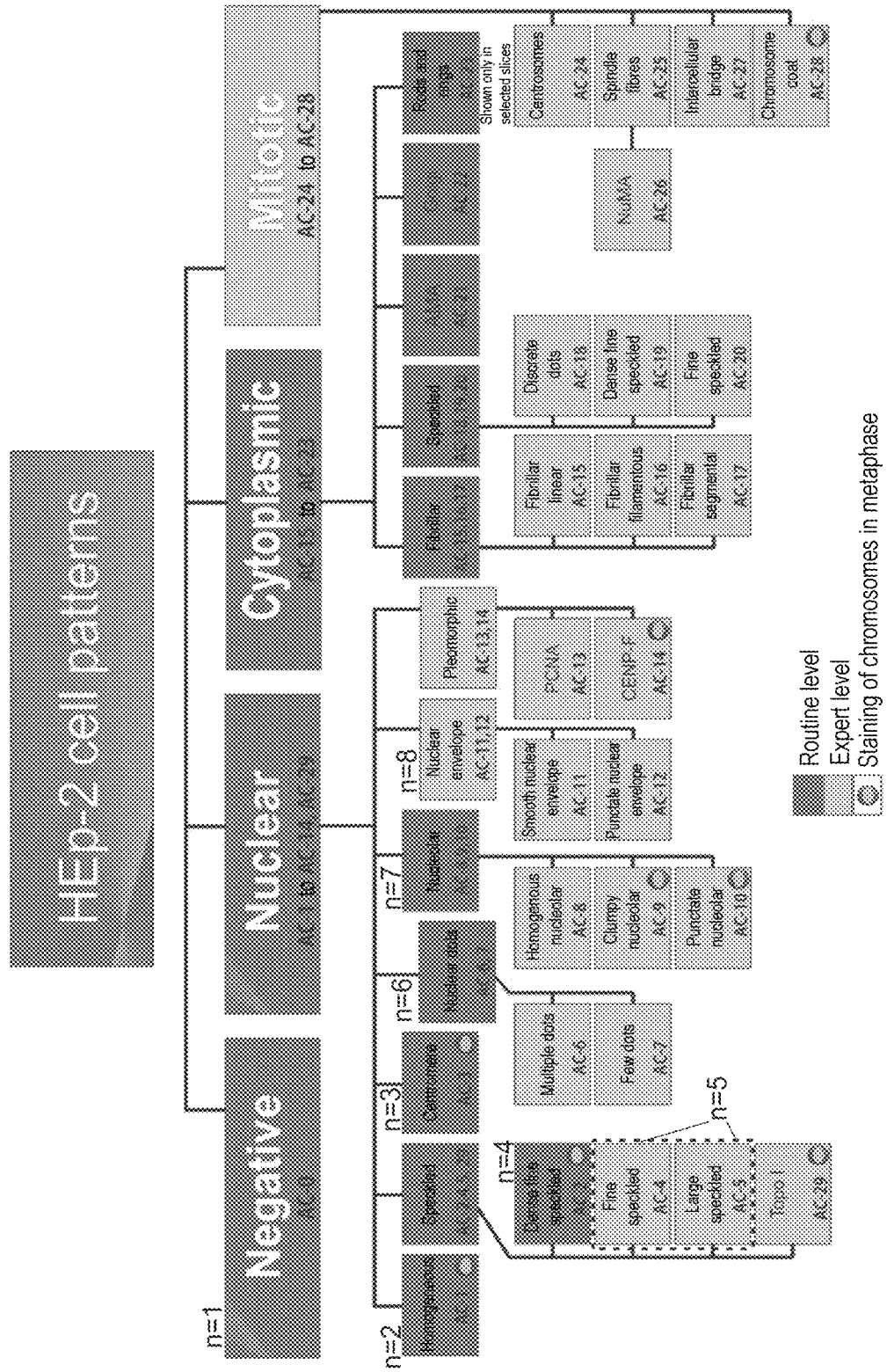
FIG. 18 shows a classification scheme for different fluorescence pattern types.

The pattern BM2 is so-called homogeneous staining or the pattern type homogeneous, which is referred to in FIG. 18 as AC-1 with the pattern index n=2 used by way of example here.

The pattern type of the pattern BM3 is so-called centromere staining, which is referred to in FIG. 18 as AC-3 with the pattern index n=3 used by way of example here.

The pattern type BM4 is so-called dense fine speckling, which is referred to as pattern type AC-2 in FIG. 18 with the pattern index n=4 used by way of example here.

The pattern type BM5 is a so-called fine or large speckled pattern, which is referred to in FIG. 18 as AC4 or AC5 with the pattern index n=5 used by way of example here.

The pattern type BM6 constitutes so-called nuclear dots as the pattern type, which is referred to in FIG. 18 as pattern type AC-6,7 with the pattern index n=6 used by way of example here.

The pattern type BM7 is a so-called nucleolar pattern type, which is referred to in FIG. 18 as AC-8,9,10 with the pattern index n=7 used by way of example here.

The pattern type BM8 is a so-called nuclear envelope or nuclear membrane pattern type, which is referred to in FIG. 18 as pattern type AC-11,12 with the pattern index n=8 used by way of example here.

The different antinuclear antibody fluorescence pattern types thus comprise homogeneous patterns (AC-1), speckled patterns (AC-2,4,5), a centromere pattern (AC-3), nuclear dot patterns (AC-6,7), nucleolar patterns (AC-8,9,10), and the fluorescence pattern type nuclear envelope (AC-11,12). A further class of fluorescence pattern type is then the so-called negative class (AC-0) in the case of a patient sample without any specific primary antinuclear antibodies.

The image B from FIG. 8 is a fluorescence image chosen by way of example that comprises both a presence of the homogeneous pattern (AC-1) and of fine or large speckled patterns (AC-4, AC-5). The way in which the convolutional neural network proposed here can detect these two pattern types will be dealt with later below.

Figure 1:
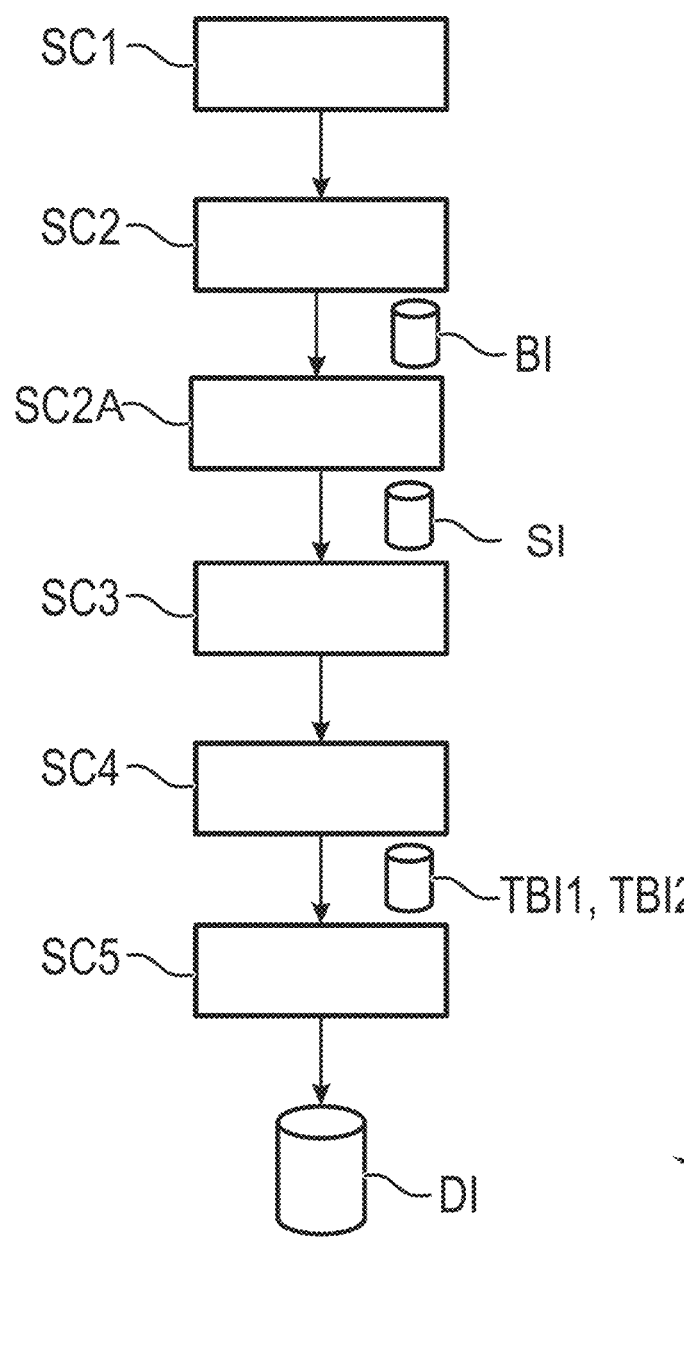
FIG. 1 shows steps of the method according to the invention as per a preferred embodiment.

FIG. 1 shows the essential steps of the method V according to the invention. In a first step SC1, what takes place is the incubation of the cellular substrate.

In a step SC2, what takes place is the acquisition of the total image, with the result that image information BI is provided.

In a step SC2A, what takes place is the determination of a segmented image by means of segmentation of the total image. This yields so-called segmentation information SI.

Figure 10B:
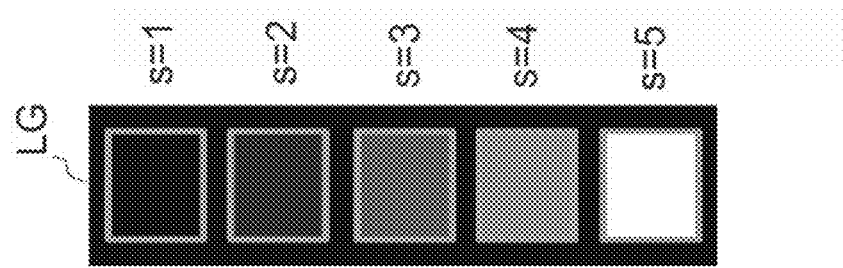
FIG. 10B shows a legend to FIG. 10A.
Figure 10A:
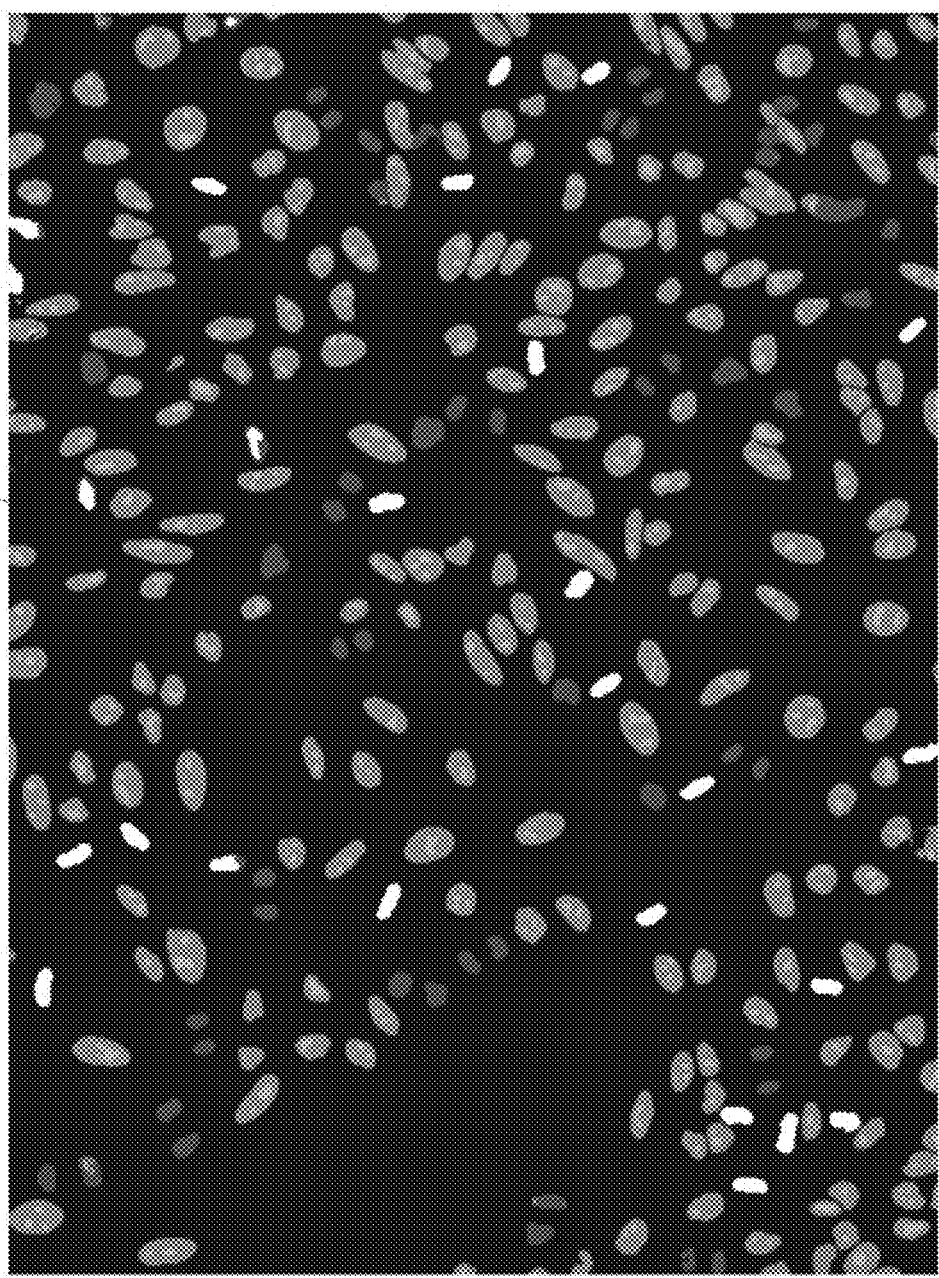
FIG. 10A shows a segmented total image.

Such segmentation information SI is depicted as a segmented image SB in FIG. 10A. In relation to this, FIG. 10B shows different grey value levels relating to the different segment classes s=1 . . . S for S=5, which grey value levels indicate here the different segment classes in the image SB from FIG. 10A. The first segment class s=1 is a so-called background class. A second class s=2 indicates a poor mitosis cell or a mitosis cell of insufficient quality, also alternatively called an invalid mitosis cell. In the context of this invention, a mitosis cell is of insufficient quality or is invalid if it is present in an incorrect or invalid stage of mitosis. A further class s=3 indicates an interphase cell. A further class s=4 indicates a region containing nucleoli. A further class s=5 indicates a so-called good mitosis cell or a mitosis cell of sufficient quality, also called valid mitosis cells. Preferably, such an image segment of class s=5 indicates a mitotic cell or a mitosis cell in a so-called metaphase stage. Very particularly preferably, such an image segment indicates a metaphase plate of a mitosis cell in a so-called metaphase stage. In the context of this invention, a mitosis cell is of sufficient quality or is valid if it is present in a correct or valid stage of mitosis. A correct or valid stage of mitosis is the so-called metaphase. A mitosis cell which is not present in a metaphase is thus an incorrect or invalid mitosis cell. In particular, the segmented image thus comprises at least one segment class which represents or indicates a metaphase plate of a mitosis cell in a metaphase stage. In FIG. 10A, these are the image segments which are purely white.

In a next step SC3, what takes place is the detection in the segmented image of respective image segments which each represent at least one mitotic cell, especially at least one valid mitosis cell. In the context of this invention, a mitosis cell is of sufficient quality or is valid if it is present in a correct or valid stage of mitosis. A correct or valid stage of mitosis is the so-called metaphase. A mitosis cell which is not present in a metaphase is thus an incorrect or invalid mitosis cell. Thus, what are preferably detected are those image segments which each represent a valid mitotic cell in the segmented image by said respective image segments indicating respective metaphase plates of respective mitosis cells in a metaphase stage. In FIG. 10A, these are the image segments which are purely white.

According to FIG. 1, what then takes place in a step SC4 is the selection of sub-images of the total image which each comprise at least one mitotic cell, preferably of sufficient quality, and of corresponding sub-images of the segmented image on the basis of the detected image segments. Thus, what are preferably selected are those sub-images which each comprise at least one image segment which, in turn, indicates a metaphase plate of a mitosis cell in a metaphase stage.

In relation to this, FIG. 11 shows again the image B, which is divided into sub-images TBA, TBB, TBC, TBD and also further sub-images. White squares indicate mitosis cells VMZ which are valid and which are preferably of sufficient quality or in a metaphase stage. White circles indicate invalid mitosis cells IMZ of insufficient quality. In this example, the sub-image TBB is not selected because it does not comprise a valid mitosis cell VMZ.

Figure 11:
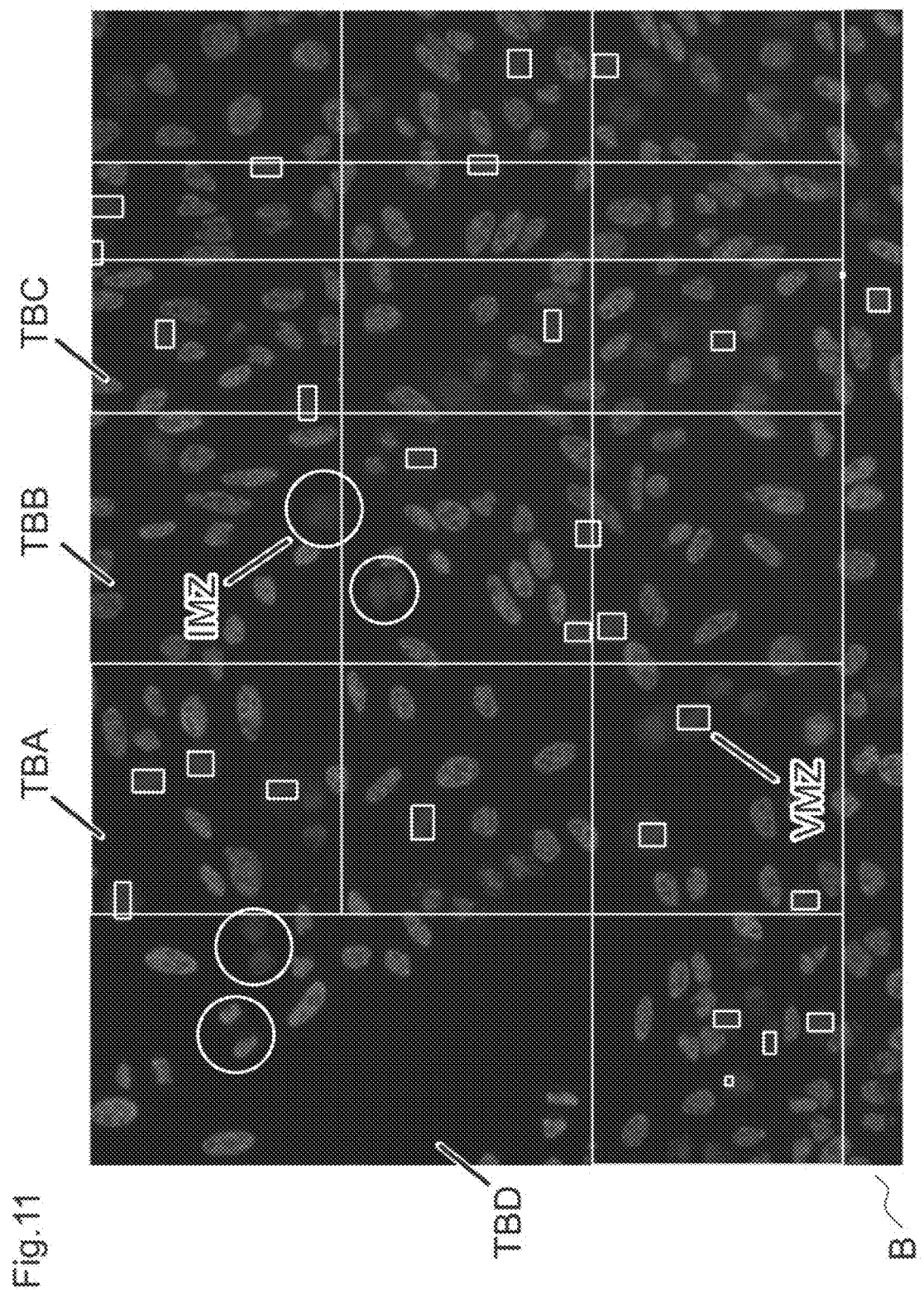
FIG. 11 shows division of the total image into sub-images and highlighting of different mitosis cells.

The image B can preferably be divided into appropriate sub-images in such a way that position information of mitosis cells from the image SB of FIG. 10A indicates whether such a valid mitosis cell is present within a sub-image of the image B. In relation to this, FIG. 11 shows an appropriate division into sub-images undertaken for the image B and detected image segments which comprise the valid mitosis cells VM of sufficient quality.

According to FIG. 1, what takes place in step SC4 is the selection of sub-images of the total image which each comprise at least one mitotic cell and of corresponding sub-images of the segmented image on the basis of the detected image segments (VMZ).

In a step SC5, what then takes place is the detection of respective actual presences of the respective cellular fluorescence pattern types by means of a convolutional neural network on the basis of the selected sub-images of the total image and the selected sub-images of the segmented image.

Because the focus is preferably on image segments comprising a mitotic cell of sufficient quality and because, furthermore, the sub-images are selected depending on those detected image segments which each indicate at least one mitotic cell of sufficient quality, it is ensured that the mitosis cell under contemplation, or the mitosis cell present in the sub-image, is in a correct stage for representing, as a valid mitosis cell with respect to its staining of its metaphase plate, valid and reliable information for the detection of the different antinuclear antibody fluorescence pattern types.

Figure 2:
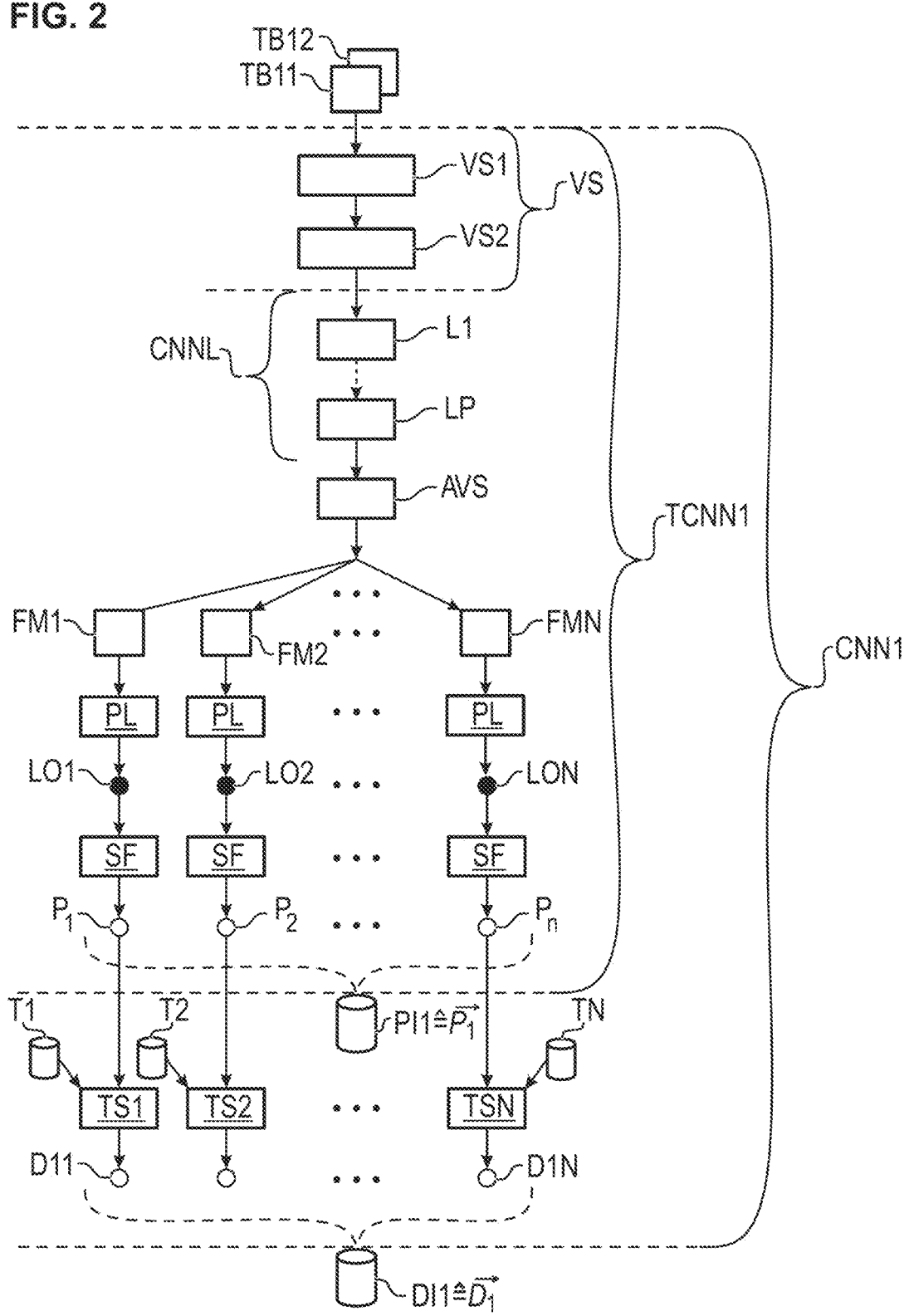
FIG. 2 shows processing of sub-images by a convolutional neural network as per a preferred embodiment.

FIG. 2 shows essential steps of the convolutional neural network in an embodiment CNN1 for determination of detection information DI1 with respect to a presence of antinuclear antibody fluorescence pattern types for a sub-image TB11 of the total image by means of simultaneous processing or analysis of the sub-image TB11 of the total image and the corresponding sub-image TB12 of the segmented image. The sub-images TB11 and TB12 are thus a sub-image tuple. The sub-images TB11 and TB12 are preferably normalized to a value range or grey value range of from 0 to 1.

FIG. 12 shows an exemplary sub-image TBA as a sub-image TB11 of the total image B and a corresponding sub-image TBS, TB12 from the segmented image SB.

It can be clearly seen that the sub-image TB11 comprises valid mitosis cells or mitosis cells of sufficient quality, which are indicated as VMZ in the segmented sub-image TBS, TB12. The image segments VMZ which are segmented and in white represent or indicate, in particular, metaphase plates of mitosis cells in a metaphase stage.

Such sub-image tuples TB11, TB12 are then, according to FIG. 2, processed simultaneously or together by the convolutional neural network CNN1. As a result, the convolutional neural network can, by means of the sub-image TB12 of the segmented image SB, focus on localization information based on cellular regions or cellular structures which are indicated in the segmented sub-image TB12, and simultaneously also detect the actual patient-specific fluorescence patterns in the sub-image TB11 of the total image. In other words: the sub-image TB12 of the segmented image SB helps the convolutional neural network to focus on respective regions of cells or cellular structures characteristic of respective pattern types when analyzing the sub-image TB11 of the total image B.

The convolutional neural network CNN1 then determines detection information DI1 in order to output, for N different classes, with index n=1 ... N and N=8 by way of example here, in each case a value which detects or indicates the presence of the pattern in the value range $D_n \in \{0,1\}$ as a Boolean value. The detection information DI1 for all N pattern types or pattern classes having the values D11, ..., D1N then corresponds to a vector $$\vec{D_1} = \begin{Bmatrix} D_{11} \\ \vdots \\ D_{1N} \end{Bmatrix}.$$

According to FIG. 2, what then takes place is processing via multiple layers L1, ..., LP of a convolutional neural network CNN1, wherein each layer L1, ..., LP comprises at least one convolutional layer.

The convolutional neural network CNN1 then determines for each of the N=8 classes or N=8 fluorescence pattern types a respective feature map FM1, ..., FMN. On the basis of a respective feature map FM1, ..., FMN, what is then determined is a respective measure of confidence P1, ..., PN or a respective prediction value P1, ..., PN based on a respective actual presence of the respective fluorescence pattern type with index n=1 ... N.

This is preferably done by using a pooling layer PL or a pooling layer function PL, which preferably carries out so-called global average pooling, to reduce a feature map FM1 to an individual scalar value or an averaged value, preferably also called a log it, as a value LO1.

The log it values LO1, ..., LON of the N classes or fluorescence pattern types are then each individually subjected to a so-called sigmoid function SF in order to determine for a respective class n, on the basis of the respective feature map FMn with index n, a respective prediction value or a respective measure of confidence Pn with index n. Thus, this structure of the convolutional neural network yields the advantage that each individual fluorescence pattern type has its own detection channel and that it is possible to detect not only a single pattern or a single pattern type as present, but also multiple pattern types at the same time.

The determination of respective measures of confidence Pn as prediction information or presence information PI1 then allows an output of prediction values or measures of confi-dence in the form of a vector $$\vec{P_1} = \begin{Bmatrix} P_1 \\ \vdots \\ P_N \end{Bmatrix}$$

with a value range $0 \leq P_n \leq 1$.

If such measures of confidence Pn are determined and preferably also output, then this is advantageous because a user can, in a later final appraisal, use a respective measure of confidence as an indicator for the presence of a respective pattern.

The sub-network TCNN1 of the convolutional neural network CNN1, which is used for determining the measures of confidence Pn on the basis of the sub-images TB11, TB12, can be applied separately in each case to respective sub-image tuples TB11, TB12 consisting of a sub-image TB11 of the total image and a corresponding sub-image TB12 of the segmented image, as will be elucidated in detail later.

FIG. 2 shows, furthermore, further steps, by means of which it is possible to determine, on the basis of the measures of confidence or prediction values, which can be combined as prediction information PI1, detection results or detection values D11, ..., DIN, which, in turn, can be combined as detection information D11.

A measure of confidence Pn can then be evaluated via a thresholding function TS1 using a threshold value T1 preferably specifiable by a user or a threshold value specified in another way, in order to determine the relevant detection information D11. Preferably, the detection value D11 can assume the value 1, i.e. can indicate a presence of the pattern with the index n=1, if the measure of confidence Pn exceeds a threshold value T1 of 0.5.

Application of further thresholding operations TS1, ..., TSN using respective individual thresh-old values T1, ..., TN preferably for the respective patterns then allows the ascertainment of the detection values D11, ..., DIN.

The convolutional neural network CNN1 from FIG. 2 comprises a partial convolutional neural network TCNN1, which will be used later in FIG. 3.

FIG. 13 shows exemplary feature maps FM1, ..., FM8 for detecting different fluorescence pattern types or example patterns for the sub-image TB11 from FIG. 12. Such patterns are depicted in FIG. 9 by way of example and are examples of relevant fluorescence pattern types from FIG. 18 with the relevant designations. The feature map FM2 from FIG. 13 depicts activation regarding a homogeneous pattern for the sub-image TB11 from FIG. 12. The degree of brightness in the feature map FM2 thus indicates a probable presence of a homogeneous fluorescence pattern type in the sub-image TB11. Furthermore, the feature map FM5 depicts a probable presence of fine speckled or large speckled patterns in the relevant sub-image TB11. For the other feature maps FM1, FM3, FM4, FM6, FM7, FM8, there is no activation or relatively low activation. The feature maps FM1, ..., FM8 from FIG. 13 were originally determined with a resolution of 8×8 pixels and then interpolated by means of interpolation to the resolution of 512×512 pixels of the sub-image TB11.

Figure 14A:
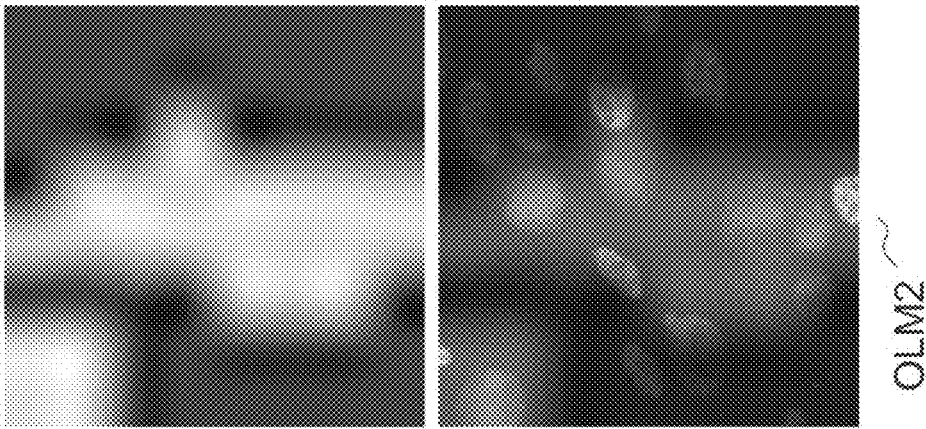
FIG. 14A shows the sub-image of the total image from FIG. 12.
Figure 14B:
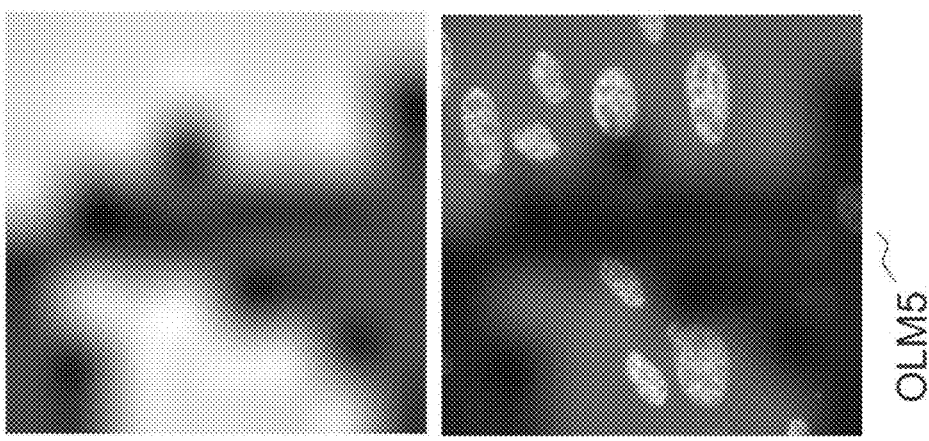
FIG. 14B shows a feature map of a particular fluorescence pattern type as well as an associated overlay image for the sub-image from FIG. 14A.

FIG. 14A shows again the sub-image TB11 from FIG. 12 together with the feature map FM5 in FIG. 14B and also an overlay of said feature map FM5 over the sub-image TB11 as an overlaid feature map OLM5. It is clearly evident here that the proposed convolutional neural network was able to generate a feature map FM5 which highlights or identifies cell nuclei having fine or large speckling.

Figure 14C:
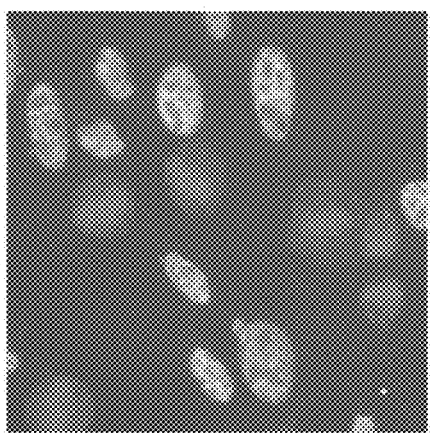
FIG. 14C shows a feature map for another particular fluorescence pattern type as well as an associated overlay image for the sub-image from FIG. 14A.

FIG. 14C shows the feature map FM2 from FIG. 13 for homogeneous patterns, and also a feature map OLM2 overlaid over the sub-image TB11 of FIG. 14A. Here too, it is evident that it was possible, by means of the proposed convolutional neural network, to highlight or detect from the sub-image TB11 that region which depicts cell nuclei with homogeneous staining or a homogeneous pattern type.

Looking at FIG. 12 and the segmented sub-image TBS, TB12, it is evident that it is precisely the valid mitosis cells VMZ with their metaphase plates that are those cells which are detected according to FIG. 14C in the overlaid feature map OLM2 for the detection of the homogene-ous pattern. Even though, in principle, homogeneous staining may be present on the inter-phase cells which were selected in the overlaid feature map OLM5 from FIG. 14B, it is, however, covered by the speckled staining of said interphase cells, and so it is not possible to reliably detect a homogeneous pattern alone on said interphase cells from FIG. 14B in the overlaid feature map OLM5. However, because it was ensured that the selected sub-image TB11 from FIG. 12 comprises valid mitosis cells VMZ in any case, it is thus advantageously possible to identify the homogeneous pattern staining or the homogeneous fluorescence pattern type on precisely said valid mitosis cells, as is evident by a joint look at the overlaid feature map OLM2 from FIG. 14C and the sub-image TB11 from FIG. 14A and at the corresponding segmented sub-image TB12 from FIG. 12.

Figure 3:
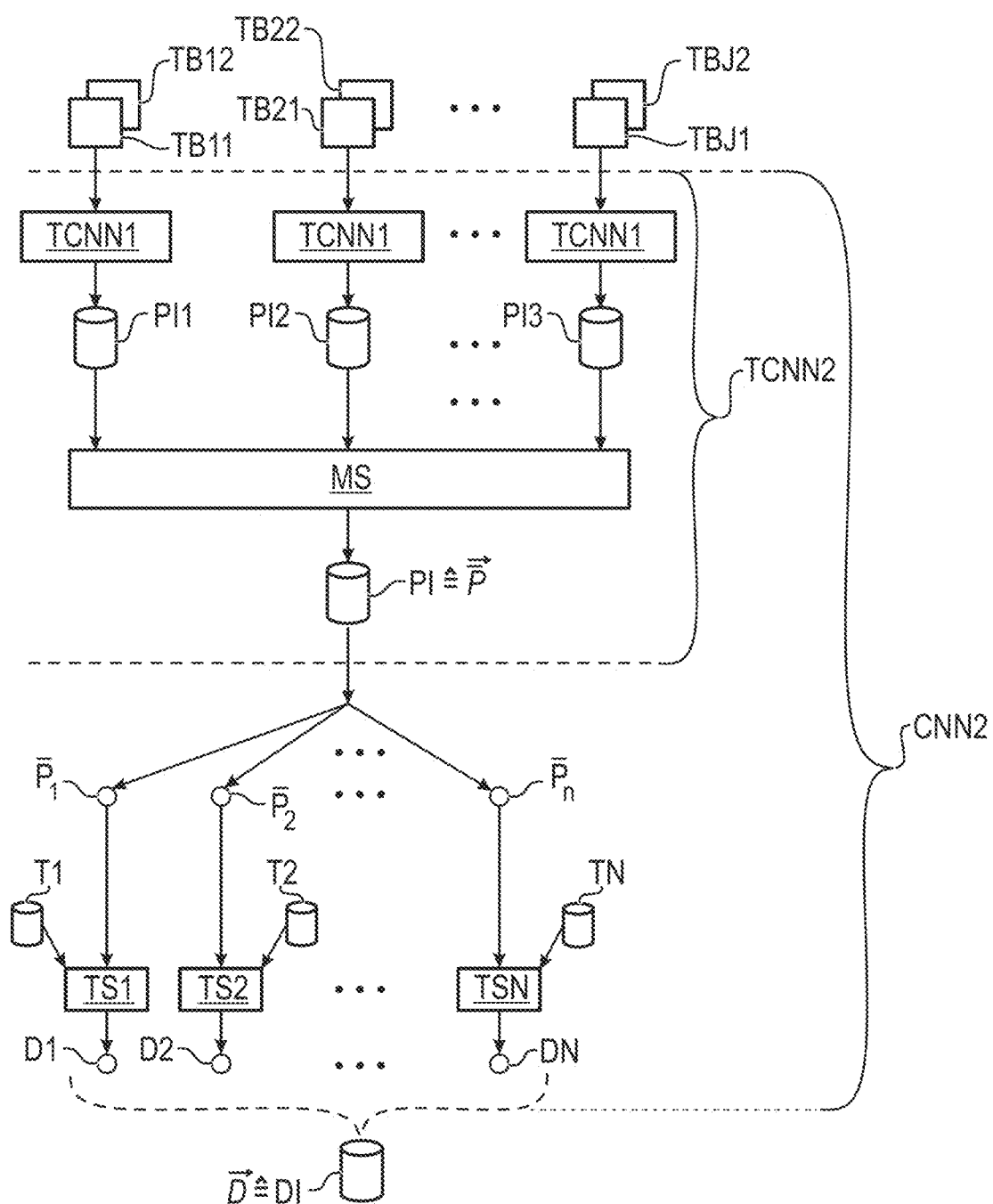
FIG. 3 shows processing of multiple sub-images by a convolutional neural network as per a preferred embodiment.

FIG. 3 illustrates further advantageous embodiments of the method according to the invention. The convolutional neural network CNN2 depicted here uses the partial convolutional neural network TCNN1 from FIG. 2 for determining respective sub-image measures of confidence PI1, ..., PIJ for respective sub-image tuples TB11, TB12, ..., TBJ1, TBJ2 with tuple index j=1 ... J, as previously depicted and elucidated in detail in FIG. 2, in order to then determine the respective actual presences of the respective fluorescence pattern types and the associated respective measures of confidence on the basis of the sub-image measures of confidence as presence information or prediction information PI. Here, a sub-image measure of confidence PI corresponds to a vector $\vec{P}_j$ with index j. The information PI corresponds here to a vector $$\vec{P} = \left\{ \begin{array}{c} \overline{P}_1 \\ \vdots \\ \overline{P}_N \end{array} \right\}$$

with a respective measure of confidence $\overline{P}_n$ for a respective fluorescence pattern type with index n.

The resultant sub-image measures of confidence $\vec{P}_j$ with index j=1 ... J are then averaged in an averaging step MS over all selected j=1 ... J sub-images or sub-image tuples according to $$\vec{P} = \frac{1}{J} \sum_{i=1}^{J} \vec{P}_i.$$

These measures of confidence $$\vec{P} = \left\{ \begin{array}{c} \overline{P}_1 \\ \vdots \\ \overline{P}_N \end{array} \right\}$$

can then be output as the prediction information or confidence information PI.

This embodiment of the method according to the invention is advantageous because there is thus no need for a convolutional neural network CNN2 to simultaneously process all the information of an entire fluorescence image B and an entire segmented image SB at once; instead, the sub-image tuples can each be separately evaluated in separate processing paths separated from one another.

The ascertained measures of confidence PI or $$\vec{P} = \left\{ \begin{array}{c} \overline{P}_1 \\ \vdots \\ \overline{P}_N \end{array} \right\}$$

can then be assessed in respective threshold-value assessment steps TS1, ..., TSN using threshold values T1, ..., TN, which are preferably specifiable or else specified in another way, in order to output relevant detection information DI having relevant detection values D1, ..., DN with index n=1 ... N as $$\vec{D_1} = \left\{ \begin{array}{c} D_1 \\ \vdots \\ D_N \end{array} \right\}$$

Figure 5:
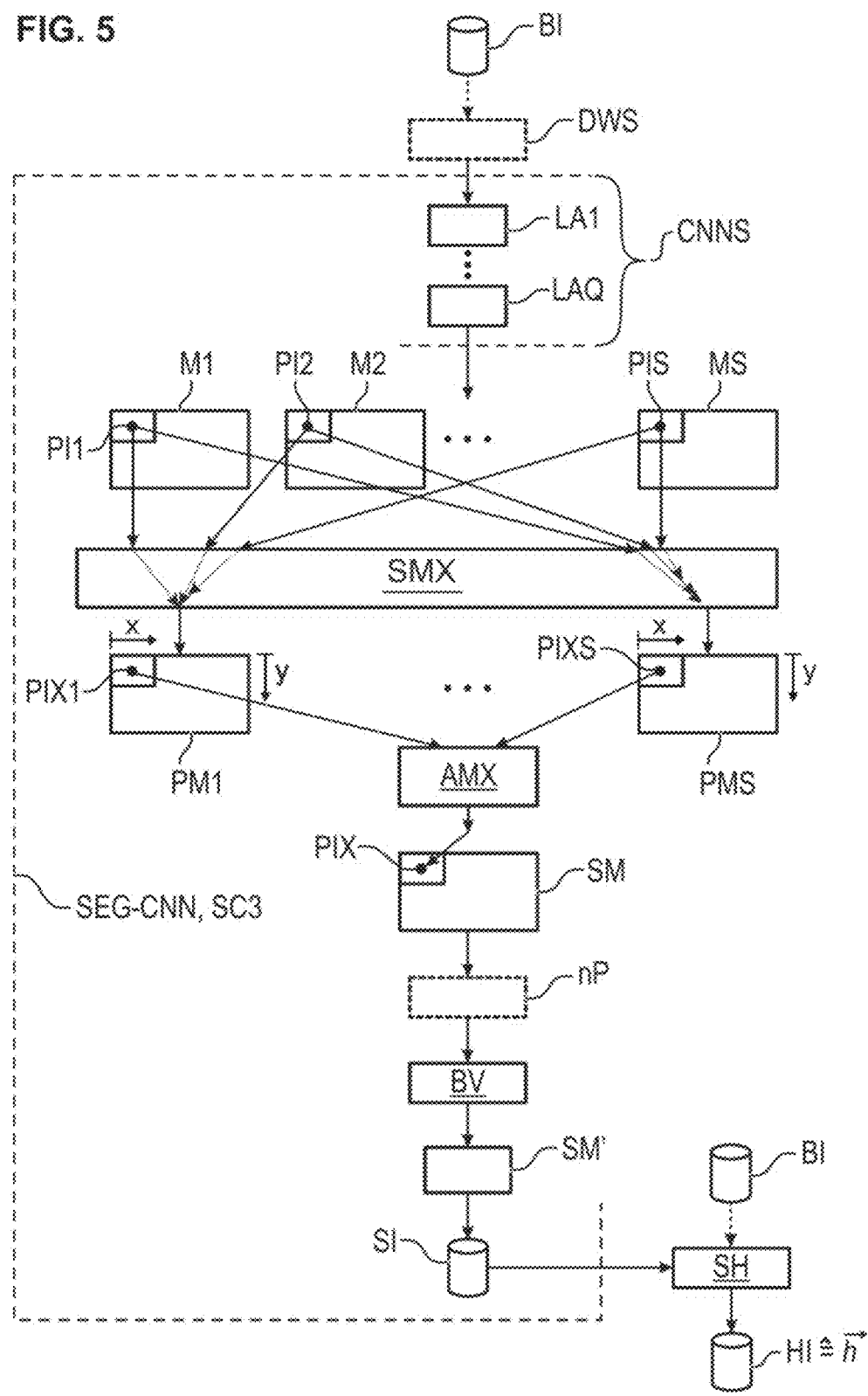
FIG. 5 shows detailed steps of a method for segmentation of the total image as per a preferred embodiment.

FIG. 5 shows details of step SC3 from FIG. 1 for detection of image segments which each represent at least one mitotic cell, preferably of sufficient quality, by means of analysis of the total image or the image information BI thereof. This is done by means of a segmentation convolutional neural network SEG-CNN. The segmentation convolutional neural network SEG-CNN comprises steps or layers LAL LAQ which, in turn, can be understood as a convolutional neural network. Segmentation is thus done by means of a further convolutional neural network SEG-CNN, which differs from the convolutional neural network CNN2 for detection of respective actual presences of the respective cellular fluorescence pattern types by means of a convolutional neural network on the basis of the selected sub-images of the total image and the selected sub-images of the segmented image. Allocating the task of segmentation and the task of detection to two different convolutional neural networks is advantageous because the convolutional neural network for detection need not also be trained for the purposes of segmentation and thus the convolutional neural network for the purposes of segmentation can be trained in a particularly specific manner.

According to FIG. 5, the total image or the relevant image information BI is supplied to a convolutional neural network CNNS for the purposes of segmentation.

FIG. 5 depicts the segmentation convolutional neural network SEG-CNN, which causes segmentation of an input image by means of multiple layers LA1, LAQ. Preferably, the image data BI are normalized here to a value range of from 0 to 1. Furthermore, so-called downscaling is preferably carried out in an optional step DWS. Preferably, an image of the image data BI has a dimensionality of 2400× 1700 pixels. Said image can then be reduced to a size of 800×800 pixels by so-called downsampling. The further processing steps are explained in detail here for the exemplary case of downscaling DWS of the total image having been carried out to a size of 800×800 pixels. However, this is not absolutely necessary; the segmentation convolutional neural network SEG-CNN can also be configured in terms of its dimensioning such that it can process the total image with a size of 2400×1700 pixels without downscaling.

The convolutional neural network CNNS comprises multiple layers LA1, . . . , LAQ, with each of said layers comprising at least one convolutional layer. The convolutional neural network CNNS then generates a respective activation map M1, . . . , MS for each of the segment classes s=1 . . . S, with for example S=5 classes here, as indicated in FIG. 10B by the legend. The activation maps M1, . . . , MS each preferably have a size or resolution of preferably 800×800 pixels, identical to the total image or the image data BI after the downscaling DWS.

The activation map M1 for the first segment class s=1 indicates in its first pixel PI1, with the value present there, the degree to which the corresponding pixel of the image B or the image information BI belongs to said first segment class. Relevant individual pixels PI1, . . . PIS of the activation maps M1, . . . MS each indicate the degree to which the pixel of the image B or the image information BI, located at the same point, belongs to the relevant class. By linking the values of the activation maps M1, M2, . . . , MS at the same pixel point or the relevant values of this corresponding pixel point PI1, PI2, . . . , PIS by means of a so-called softmax function SMX, it is then possible to generate, for a probability map PM1 at the relevant pixel position PIX1, a value indicating the probability, in a value range of from 0 to 1, with which the corresponding pixel of the image B belongs to the first class with s=1. At the same time, the softmax function determines, for the probability maps PM1, PMS at relevant corresponding or identical pixel positions PIX1, PIX2, the relevant probabilities which each indicate the probability, in a value range of from 0 to 1, with which the corresponding pixel of the image B belongs to the respective class with index s=1 . . . S. The axial paths x and y, as depicted here, indicate respective indices for the relevant pixel positions within the probability maps PM1, PMS. The probability maps PM1, PMS preferably have a size or resolution of preferably 800×800 pixels, identical to the image B or the image data BI after the downscaling DWS and to the activation maps M1, . . . , MS.

A segmentation map SM is then determined, which has at a relevant pixel position PIX1 a value from the value range s∈{1, . . . , S} and indicates the segment class s=1 . . . S to which the relevant pixel of said position PIX1 belongs. What is effected for this purpose is linking of the relevant pixel values of the corresponding pixel position PIX1 over all probability maps PM1, . . . , PMS by means of an argmax function. A pixel of the segmentation map SM with the index x, y then thus contains that index value of that probability map PM1, . . . , PMS for which the relevant probability value at the pixel position was highest. This can be determined according to $$SM(x, y) \underset{s \in \{1 \ldots S\}}{\mathrm{argmax}} PM_s(x, y).$$

The segmentation map SM then thus contains for each individual pixel a value from the value range s=1 . . . S, which assigns the relevant pixel to a respective segment class.

The segmentation map SM preferably has a size or resolution of preferably 800×800 pixels, identical to the image B or the image data BI after the downscaling DWS, and to the activation maps M1, . . . , MS and to the probability maps PM1, PMS.

If so-called downscaling of the image B or the image information BI was effected prior to segmentation in an optional step DWS, then what can preferably be effected, in a step UP to be preferably carried out, is so-called upscaling of the segmentation map SM from preferably 800×800 pixels back to the original image resolution of the image B, for example 2400×1700 pixels.

The segmentation map SM can then be further processed to bring together sub-areas or segment areas by means of digital image processing in an image-processing step BV by customary image-processing measures such as eroding, dilation and/or contour matching, in order to then arrive at a modified segmentation map SM', which can be output as segmentation information SI. Such segmentation information SI or segmented image SB is depicted in FIG. 10A.

FIG. 5 illustrates the way in which the total image can be segmented into image segments of different segment classes, it being possible to choose the segment classes as illustrated in FIG. 10B. Preferably, at least one segment class of the plurality of segment classes indicates a metaphase stage of a mitosis cell. In other words: preferably, at least one segment class of the plurality of segment classes indicates a metaphase plate of a mitosis cell in a metaphase stage.

The segmentation information SI, as depicted in FIG. 10A as the segmentation image SB by way of example, can then be used for determining at least one brightness value for at least one fluorescence pattern type on the basis of one or more image segments of at least one particular segment class and for then verifying at least one measure of confidence of a fluorescence pattern type on the basis of at least one such brightness value.

In relation to this, FIG. 5 shows the way to extract, on the basis of the image B or the image information BI and on the basis of the segmentation information SI, at least one brightness value for at least one fluorescence pattern type from the image B or the image information BI. This is done in a step SH for determination of brightness.

Thus, according to FIG. 5, what takes place is determination of a brightness value for at least one fluorescence pattern type on the basis of one or more image segments of at least one particular segment class and verification of the measure of confidence of the fluorescence pattern type on the basis of the brightness value of the fluorescence pattern type.

For the different n=1 ... N classes, it is then possible to determine relevant brightness values $h_n$ with index n=1 ... N as vector $$\vec{h} = \begin{Bmatrix} h_1 \\ \vdots \\ h_N \end{Bmatrix}$$

and to output them as brightness information HI.

If, for example, what is focused on is a brightness value for a "dense fine speckled" (AC-2) pattern of the pattern type n=4, then the brightness value can be ascertained in such a way that use is made of the interphase cells of the segment class s=3, which are also marked in FIG. 10A, with their brightness values at the relevant corresponding points of the image B from FIG. 8. The 0.65 quantile of the brightness values can then, for example, be determined separately for each interphase cell or each segment area with index s=3 and the resultant multiple quantile brightness values of the multiple interphase cells can then be averaged again by means of averaging in order to determine a brightness value $h_4$ for the fluorescence pattern with index n=4.

For so-called fine or large speckled patterns of the type AC-4, AC-5 with index n=5, a 0.65 quantile of the brightness values of an interphase cell or a relevant segment area of the class s=3 can then, for example, be focused on and then be averaged across these brightness values to determine a brightness value $h_5$ for the fluorescence pattern with index n=5.

For so-called homogeneous patterns (AC-1) of the type with index n=2, as also illustrated in FIG. 9 by means of the example pattern BM2, a 0.5 quantile can then, for example, be first ascertained for each valid mitosis cell or each relevant segment area of the class s=5 and then be averaged across the quantile values of all valid mitosis cells in order to determine a brightness value $h_2$ for the fluorescence pattern with index n=2.

Such ascertained brightness values $$\vec{h} = \begin{Bmatrix} h_1 \\ \vdots \\ h_N \end{Bmatrix}$$

can then be provided as brightness information HI.

Figure 4:
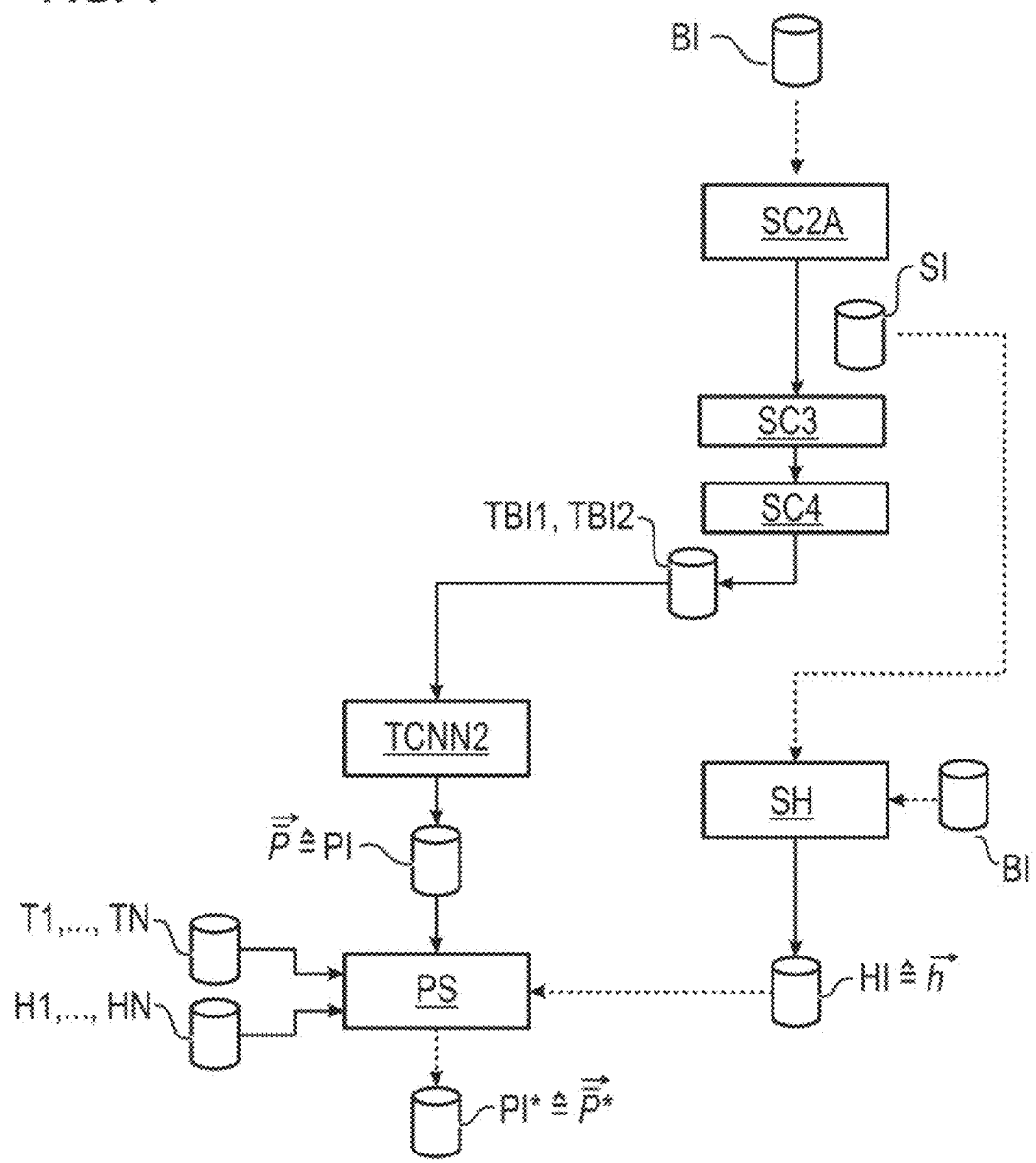
FIG. 4 shows steps for verification of measures of confidence on the basis of ascertained brightness values as per a preferred embodiment.

In relation to this, FIG. 4 illustrates an exemplary procedure in which a vector $$\vec{P} = \begin{Bmatrix} \overline{P}_1 \\ \vdots \\ \overline{P}_N \end{Bmatrix}$$

with relevant measures of confidence for the relevant n=1 ... N classes is ascertained on the basis of the image B or the image information BI by means of a partial convolutional neural network TCNN2, which is indicated in FIG. 3.

This is then provided as measure-of-confidence information or prediction information PI.

For this purpose, the partial convolutional neural network TCNN2 uses those sub-images or those items of sub-image information TBI1, TBI2 which were ascertained on the basis of the image B by means of the segmentation step SC2A, the detection step SC3 and the selection step SC4.

The previously obtained segmentation information SI is then used in a step SH for determination of the brightness values, which step was already explained in FIG. 5, in order to ascertain and provide, on the basis of the brightness values of the image B or the image information BI, the brightness information HI, which can also be described simply as vector $$\vec{h} = \begin{Bmatrix} h_1 \\ \vdots \\ h_N \end{Bmatrix}$$

In a checking step PS, what then takes place is the verification of the measure-of-confidence information PI on the basis of the brightness information HI.

Here, the values of the measure of confidence $$\vec{P} = \begin{Bmatrix} \overline{P}_1 \\ \vdots \\ \overline{P}_N \end{Bmatrix}$$

are then verified on the basis of one or more threshold values based on the measure-of-confidence values in the form of threshold values T1, ..., TN, and preferably on the basis of brightness threshold values in H1, HN which are applied to the brightness values $$\vec{h} = \begin{Bmatrix} h_1 \\ \vdots \\ h_N \end{Bmatrix}$$

This then thus allows output of verified measures of confidence PI*. The threshold values T1, ..., TN are specified. The threshold values H1, ..., HN are specified. Preferably, the threshold values T1, ..., TN can be specified by a user to influence the evaluation. Preferably, the threshold values H1, ..., HN can be specified by a user to influence the evaluation. The threshold values H1, ..., HN are individual threshold values for each fluorescence pattern type. The verified measures of confidence PI* as vector $$\vec{P^*} = \begin{Bmatrix} \overline{P^*}_1 \\ \vdots \\ \overline{P^*}_N \end{Bmatrix}$$

are then preferably ascertained according to $$\overline{P^*}_n = \begin{cases} 1 \text{ for } \overline{P}_n > T_n \cap h_n > HS_n \\ \text{otherwise } 0 \end{cases}$$

The procedure proposed here is advantageous, since the measures of confidence are first determined on the basis of the total image B or the selected sub-images, in which a convolutional neural network ascertains the measures of confidence PI, but, furthermore, brightness values HI are also explicitly additionally ascertained from the total image B in order to verify the measure(s) of confidence PI; this is preferably done without reduction to the selected sub-images. This allows an even more accurate detection of fluorescence pattern types. Here, in particular, an advantage is that the total image B is contemplated with respect to brightness values in relevant segment classes, and so, as a result, it is not only a brightness of cells or segment areas of a selected sub-image that is contemplated; instead, what are precisely also taken into account are segment areas outside selected sub-images. This means that a possible brightness artefact on an individual cell or an individual segment area of a sub-image has a less strong effect on the determination of the brightness values and thus the determination of the verified measures of confidence, since brightness values from segment areas even beyond the sub-image are applied to measures of confidence of a sub-image and a bright-ness artefact of an individual segment area is less strongly weighted for determining the verified measures of confidence.

FIG. 2 shows preprocessing steps VS, VS1, VS2 which can be used for preprocessing the sub-image TB11 of the total image and the sub-image TB12 of the segmented image. In the first preprocessing step VS1, what takes place is convolution of the sub-image TB11 and the sub-image TB12 as input feature maps with preferably eight different convolution kernels, with no striding being carried out and with maintenance of the dimensionality of the sub-images TB11, TB12 with an exemplary dimensionality of 512×512 image pixels. The choice of the number of eight convolution kernels need not necessarily be identical to the number of N=8 fluorescence pattern types or fluorescence pattern classes.

In the further preprocessing step VS2, what then takes place is so-called batch normalization, with maintenance of the number of feature maps, for example eight feature maps here.

The eight feature maps resulting from step VS2 are then processed in a sequence of P different layers L1, . . . , LP with index p=1 . . . P and, by way of example here, P=6. At the end of the layer L1, what arises is a set of, for example, R feature maps FMA1, . . . , FMAR with index r=1 . . . R. In this example, the parameter is preferably R=11. The number R of feature maps at the end of the first layer L1 can be independent of the number of fluorescence pattern types N.

Figure 19A:
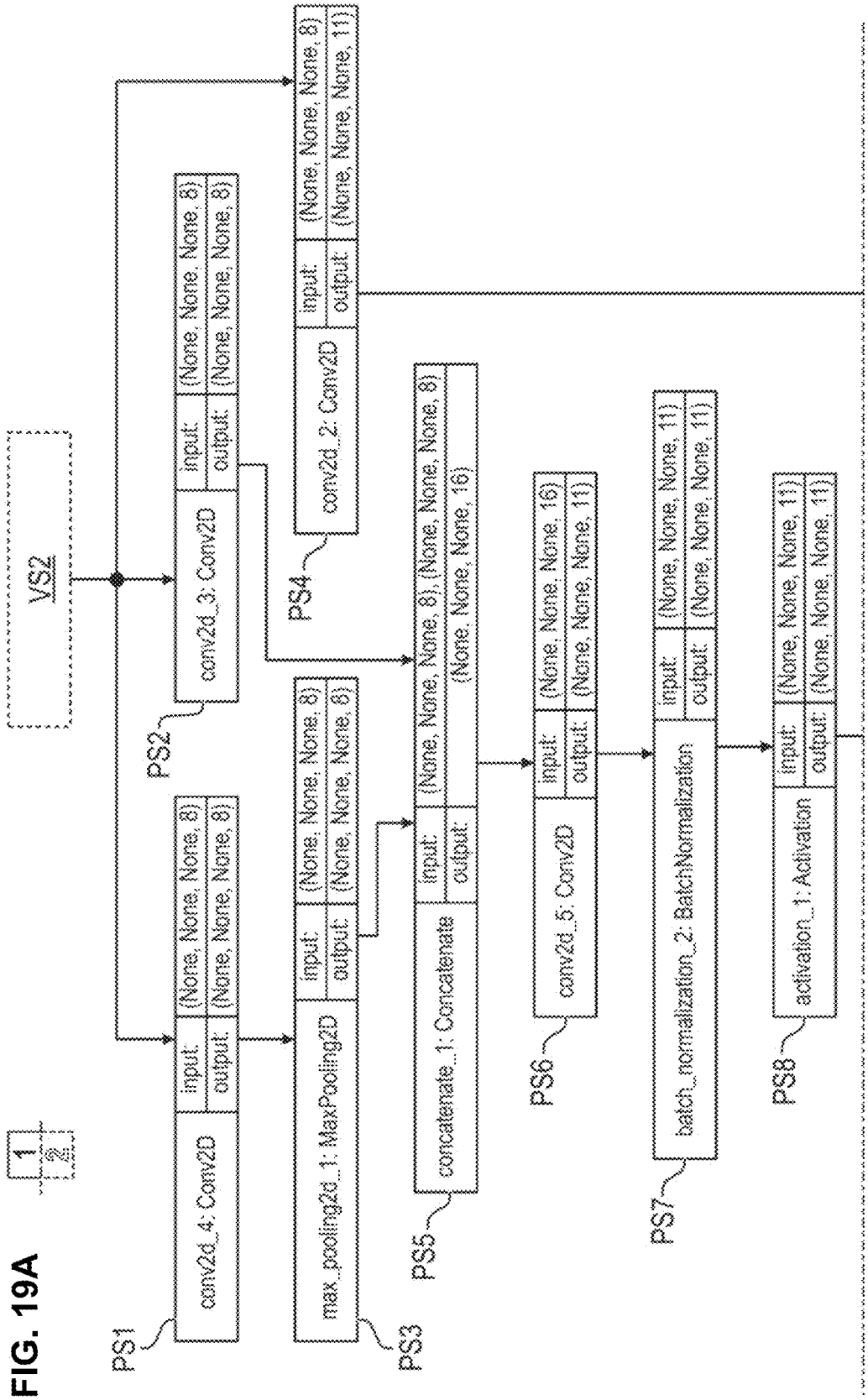
FIGS. 19A and 19B show a layer of a convolutional neural network for identifying fluorescence pattern types as per a preferred embodiment.
Figure 19B:
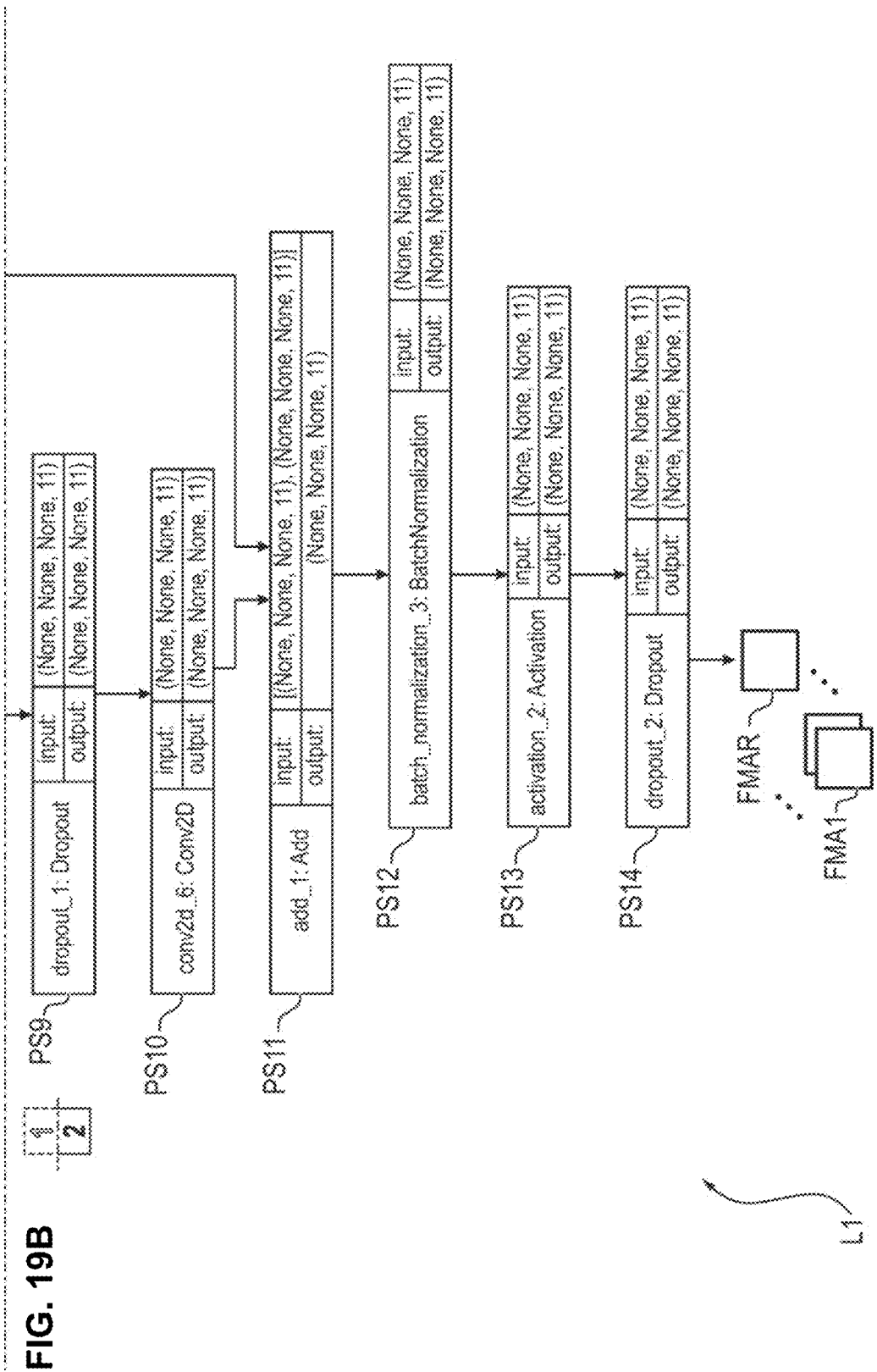

Specifically, the P layers L1, . . . , LP follow one another, FIGS. 19A and 19B present an exemplary structure of the first layer L1.

After the last layer LP, what arise are, for example, 56 feature maps with a dimensionality of 8×8 pixels. In a final processing step AVS, what then takes place is convolution with N convolution kernels in line with the number of N classes or the N fluorescence pattern types in order to generate the N different feature maps FM1, . . . , FMN.

In relation to this, FIGS. 19A and 19B show an exemplary embodiment of the first layer L1 from FIG. 2. The preprocessing step VS2 is dashed here, since it is not the subject of said layer L1, but is only upstream thereof.

The items of two-dimensional image information from the preprocessing step VS2 are each forwarded to the processing steps PS1, PS2, PS4. Each of these processing steps PS1, PS2, PS4 separately processes all the feature maps received by step VS2.

In step PS1, what takes place is convolution with 8 kernels without striding. In step PS2, what takes place is convolution with 8 kernels with a striding factor of 2. In step PS4, what takes place is convolution with 11 kernels with the striding factor of 2.

In a step PS3, what takes place is so-called max pooling with a striding factor of value 2 for each of the feature maps.

In a step PS5, the 8 feature maps from step PS3 are concatenated with the 8 feature maps from step PS2. In a step PS6, what takes place, in turn, is convolution of the 16 incoming feature maps with 11 kernels without striding.

In a step PS7, what takes place is so-called batch normalization on each of the 11 feature maps.

In a step PS8, what takes place is so-called activation, preferably in the form of a RELY activation.

In a step PS9, what takes place preferably during the training phase is so-called dropout with a dropout factor of 20%. Said dropout does not take place during the classification phase.

In a step PS10, what takes place is convolution with 11 kernels without striding.

The results of the feature maps or the 11 feature maps from step PS10 are added in an element-wise manner with the 11 feature maps from step PS4 in step PS11, so that, in turn, step PS11 generates 11 feature maps. No striding is carried out here.

In a step PS12, what takes place, in turn, is so-called batch normalization.

In a step PS13, what takes place is so-called activation, preferably in the form of a RELU activation.

In a step PS14, what then preferably takes place is dropout during the training phase with a dropout factor of, for example, 20%.

Returning to FIG. 2, it can be noted that P=6 such layers preferably follow one another, which layers are dimensioned in such a way that the last layer LP with P=6 then generates feature maps having a size of 8×8 pixels. Preferably, the last layer LP generates 56 (fifty six) various such feature maps, and what then takes place, in a postprocessing step AVS as drawn in in FIG. 2, is convolution of the 56 feature maps with N=8 kernels in order to generate the N=8 feature maps FM1, . . . , FMN.

FIG. 5 depicts the segmentation convolutional neural network SEG-CNN, which causes segmentation of the image B or the image information BI by means of the layers LA1, LAQ. Preferably, so-called downscaling is carried out in an optional step DWS. Preferably, the image in the form of the image data BI has a dimensionality of 2400×1700 pixels. Said image can then be reduced to a size of 800×800 pixels by so-called downsampling. The further processing steps, which are shown in detail later in FIGS. 20A abd 20B, are explained for the exemplary case of downscaling DWS of the total image having been carried out to a size of 800×800 pixels. However, this is not absolutely necessary; the convolutional neural network CNNS from FIGS. 20 and 20B can also be configured in terms of its dimensioning such that it can process the total image with a size of 2400×1700 pixels without downscaling.

Figure 20A:
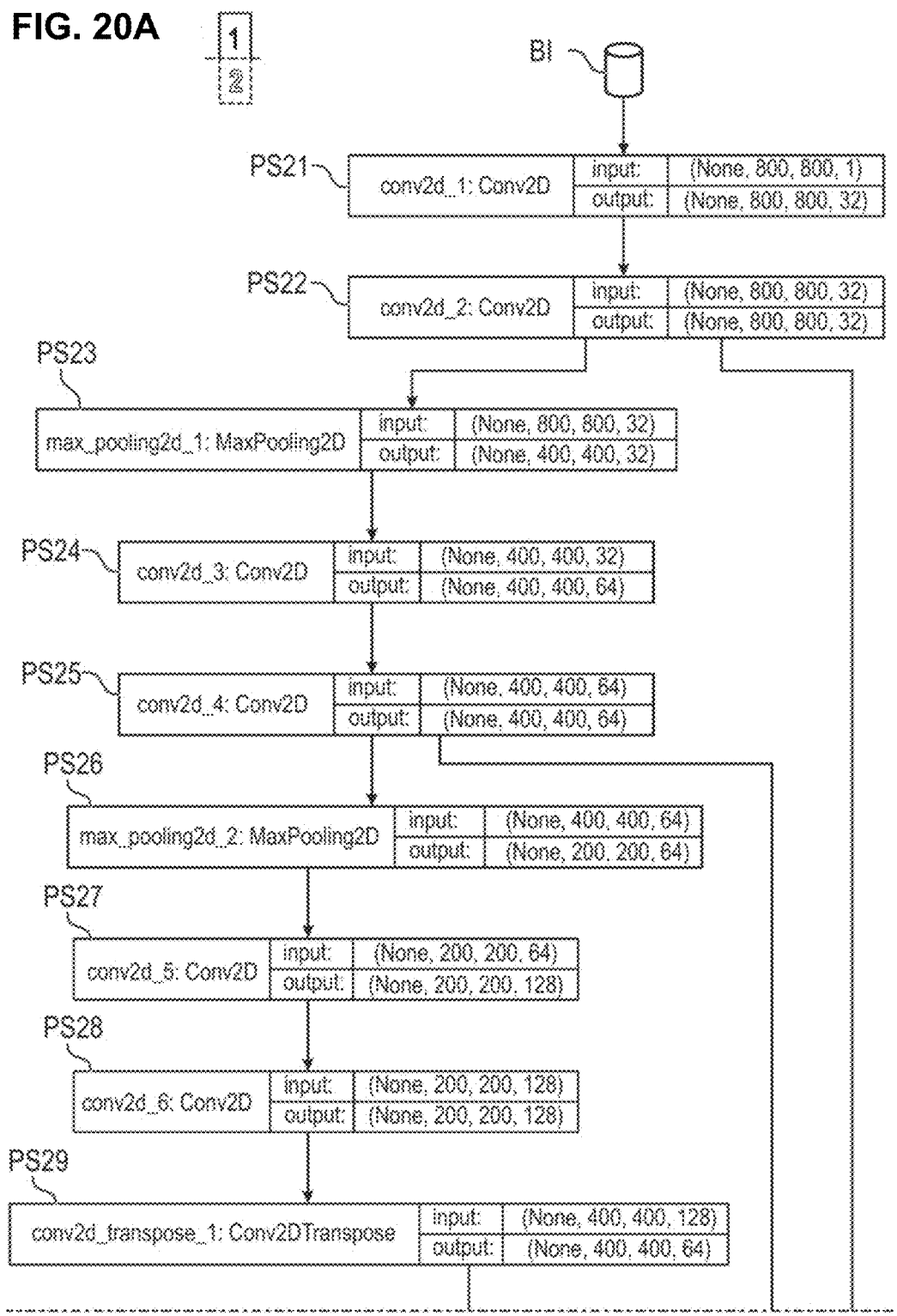
FIGS. 20 and 20B show a convolutional neural network for image segmentation as per a preferred embodiment.
Figure 20B:
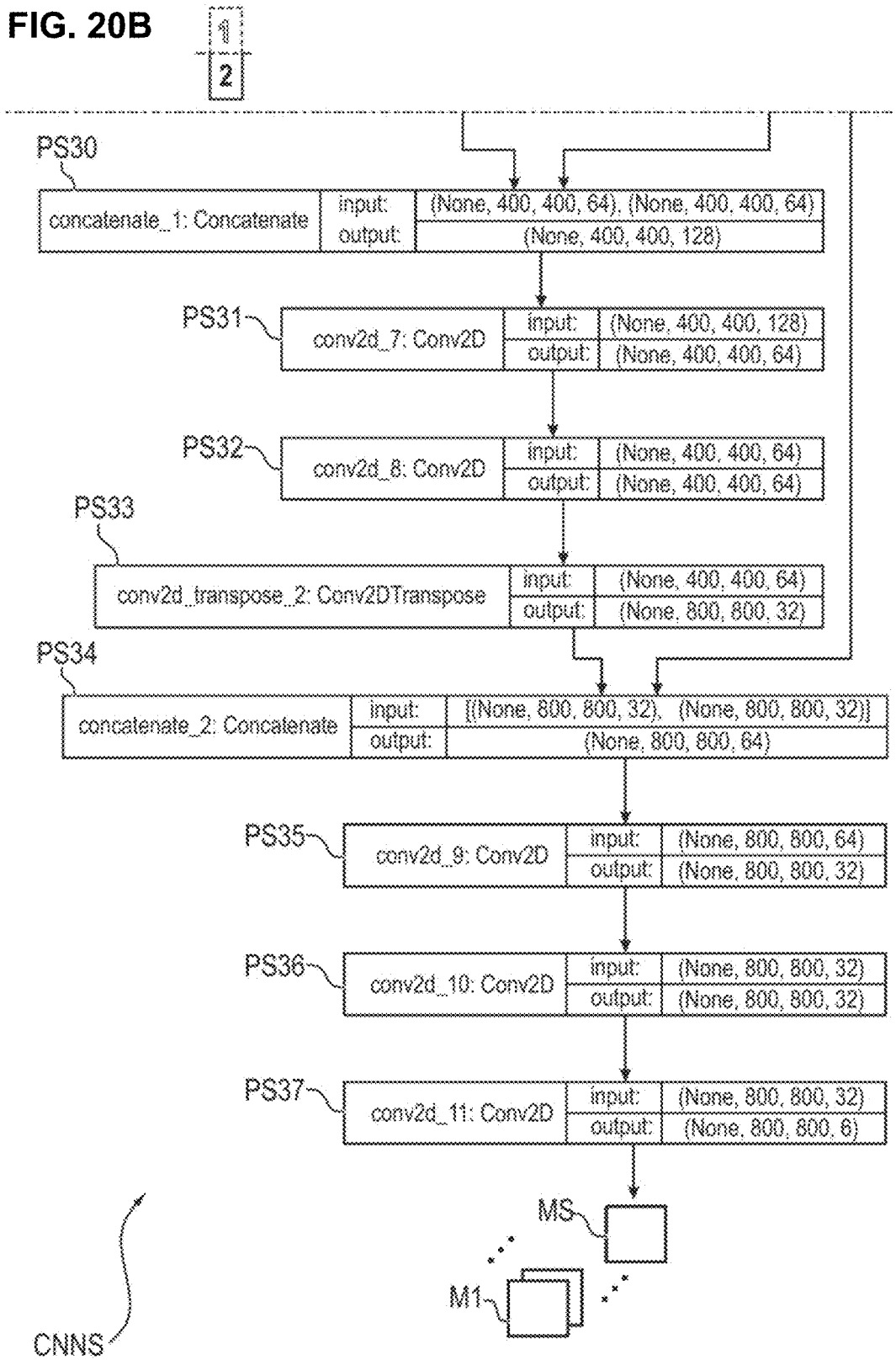

FIGS. 20A and 20B illustrate details of the convolutional neural network CNNS from FIG. 5. In FIGS. 20A and 20B, what takes place in a first step PS21 is convolution with 32 kernels, which can be read from the parameter 32 at the output layer.

Since the input variable of step PS21 has a dimensionality of 800×800 pixels and the output variable of step PS21 also has a dimensionality of 800×800 pixels, it can be deduced that no striding is carried out. For a processing step PS21, ..., P37, the dimensionality of the input variable is specified in each case as "input", between parentheses from the two numbers following the indication "None". For a processing step PS21, ..., P37, the dimensionality of the output variable is furthermore specified in each case as "output", between parentheses from the two numbers following the indication "None". By means of the various steps PS21 to PS37, what takes place is processing of the image or the image data BI towards the feature maps M1, ..., MS, as already illustrated in FIG. 5.

What should be noted here is that step PS29 carries out here so-called deconvolution or transposed convolution.

The other steps carry out either convolution, as already explained in the course of describing FIGS. 19A and 19B, or else max pooling or concatenation, as also already explained in the course of describing FIGS. 19A and 19B.

If prior to the processing of the image data BI, which is also illustrated in FIG. 5, so-called downsampling of the total image B or the image data BI was carried out, what can be carried out after determination of the segmentation map SM is relevant upsampling before the segmentation map SM is supplied to the further image-processing step BV.

Figure 15B:
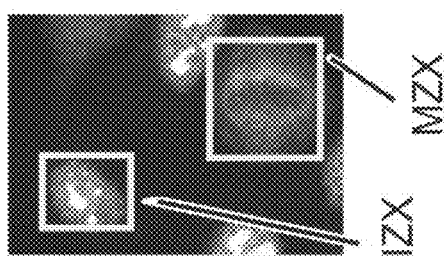
FIG. 15B shows a highlighted interphase cell as well as a highlighted mitosis cell relating to the fluorescence image from FIG. 15A.
Figure 15A:
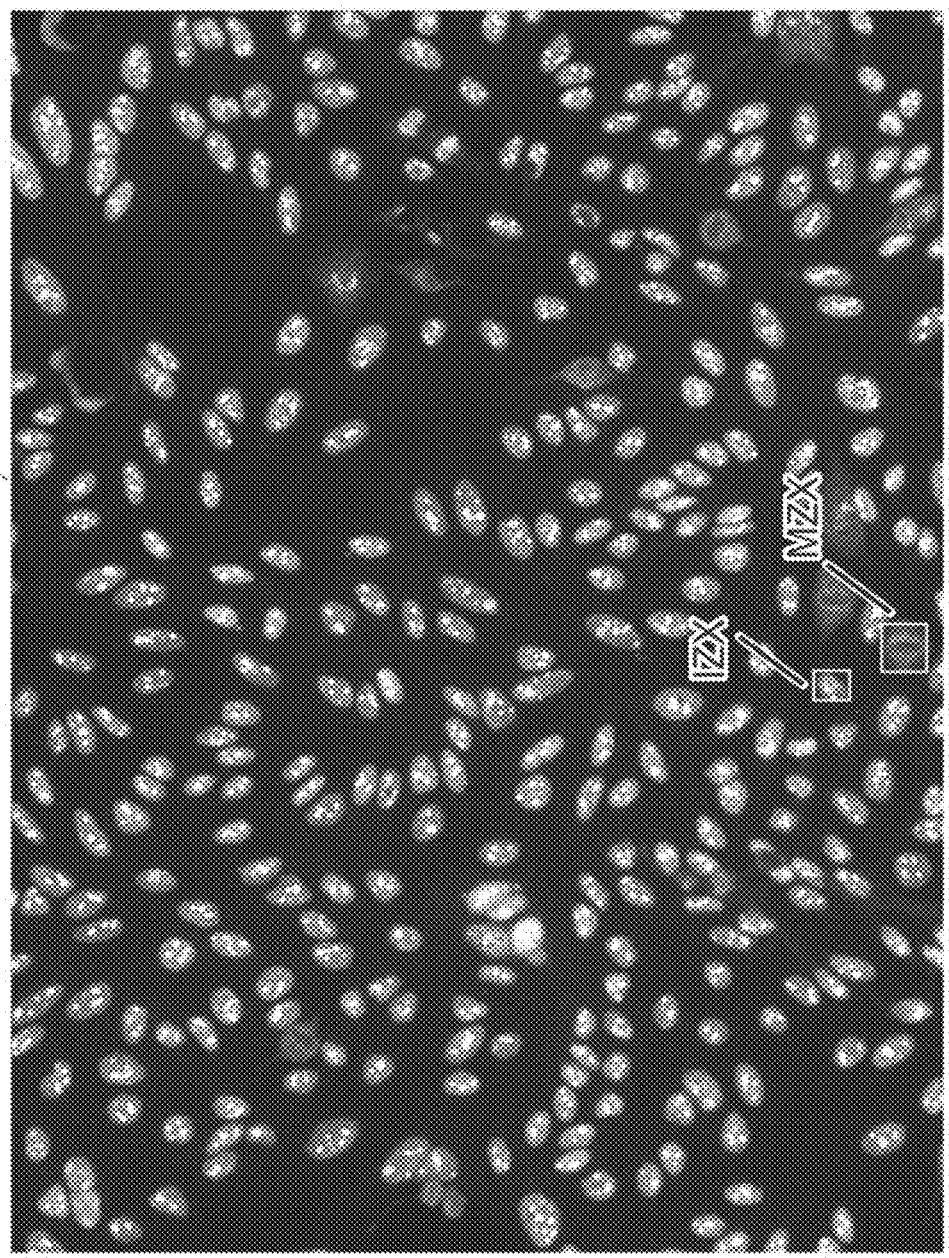
FIG. 15A shows a first further fluorescence image.

FIG. 15A shows an image BX as a fluorescence image for a mixed pattern, in which not only a nucleolar pattern (AC-8,9,10) of the class n=7 is present, but also a pattern of fine or large speckling as the fluorescence pattern type of the class n=5 (AC-4, AC-5).

In relation to this, FIG. 15B shows, by way of example, an interphase cell IZX and a valid mitosis cell MZX under magnification. It can be clearly seen that the metaphase plate of the valid mitosis cell MZX is not significantly stained or the mitosis cell with its chromosomes of the metaphase plate is not stained. This information makes it possible to distinguish whether precisely a so-called fine or large speckled pattern (AC-4, AC-5) is present here or else perhaps a homogeneous pattern (AC-1). Since, namely, the valid mitosis cell MZX with its metaphase plate is not stained there in the chromosomal region, homogeneous staining of the class n=2 can be ruled out because, in the case of homogeneous staining, the mitosis cell would also have to be homogeneously stained in the region of the metaphase plate, which is, however, not the case here. Therefore, by including the mitosis cell in fluorescence pattern type detection, it can be reliably detected that the fluorescence pattern type is not a homogeneous fluorescence pattern type, but a fine speckled fluorescence pattern type with n=5 (AC-4) or else a large speckled fluorescence pattern type with n=5 (AC-5).

Figure 16:
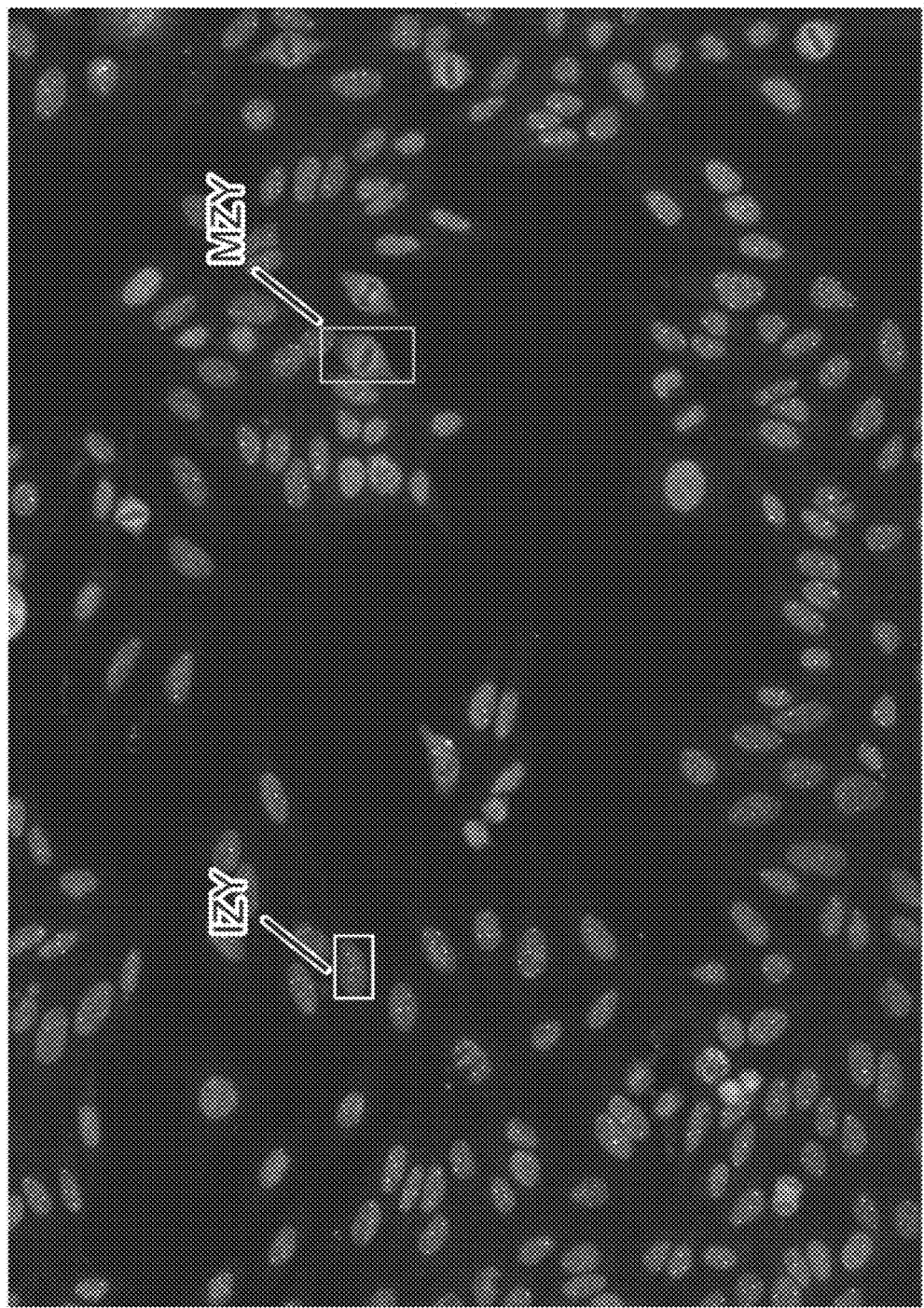
FIG. 16 shows a second further fluorescence pattern image.

FIG. 16 shows a further example BY of a fluorescence image with highlighting of a valid mitosis cell MZY and an interphase cell IZY.

Figure 17B:
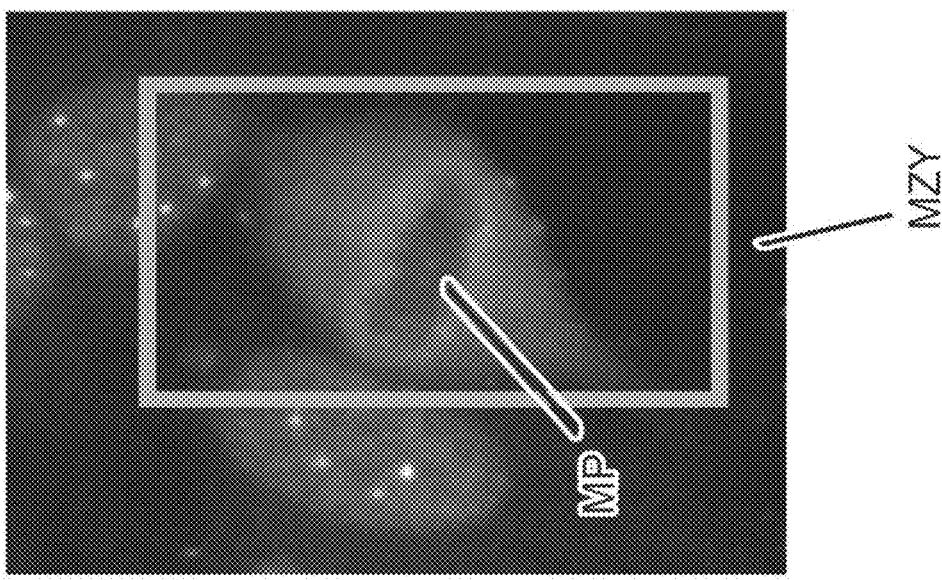
FIG. 17B shows a highlighted mitosis cell relating to the fluorescence pattern image from FIG. 16.
Figure 17A:
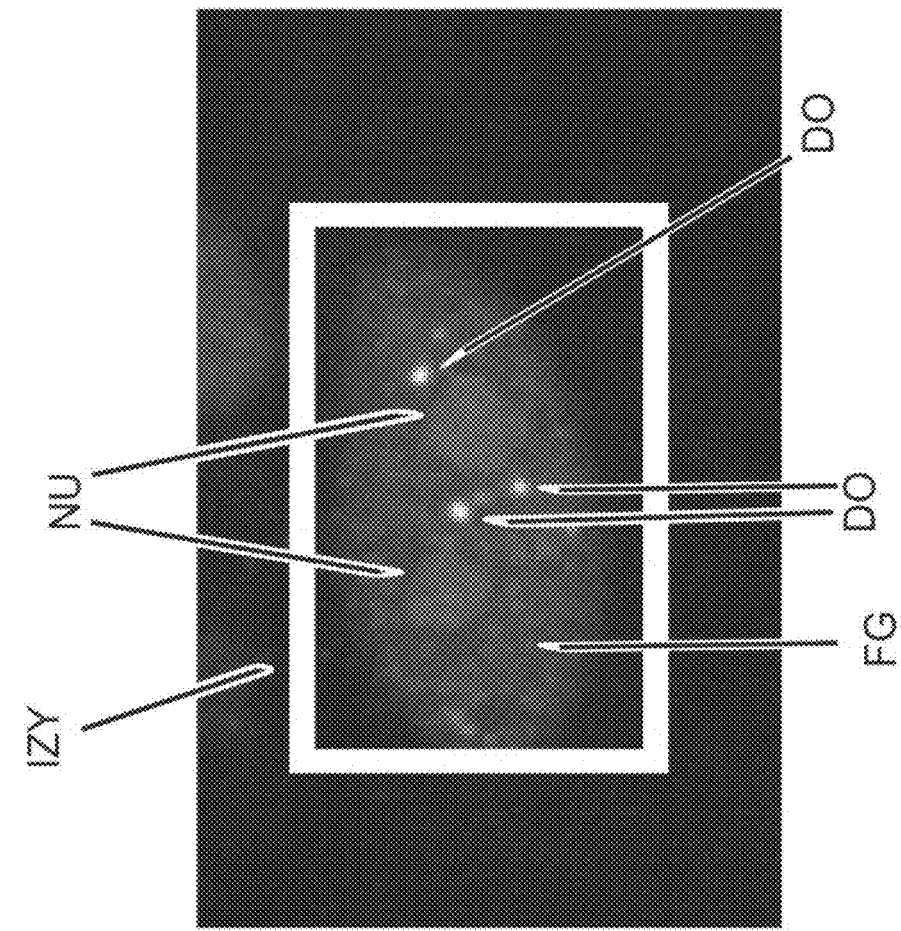
FIG. 17A shows a highlighted interphase cell relating to the fluorescence pattern image from FIG. 16.

In relation to this, shown under magnification by FIG. 17A is said interphase cell IZY, and in FIG. 17B the relevant valid mitosis cell MZY with its metaphase plate MP.

The image BY from FIG. 16 is an image having three fluorescence pattern types present. Present in this fluorescence pattern image are the fluorescence pattern type n=7, also called nucleolar (AC-8, 9,10), additionally the fluorescence pattern type n=6, also called nuclear dots (AC-6,7), and the fluorescence pattern type n=5, also called fine speckled (AC-4), as one of the variants of the fluorescence pattern type n=5 (AC-4, AC-5). In relation to this, FIG. 17A indicates the staining of the pattern nucleolar by the regions NU, the staining of the pattern of nucleolar dots by the regions DO, and also the staining by the fine speckled pattern by the further region FG of the cell nucleus.

Here, it is precisely advantageous that, according to the method of the invention, the mitosis cell MZY must also be present in a sub-image, since there is precisely no staining of the metaphase plate MP or the chromosomes thereof, meaning that the region of fine speckling FG can be reliably detected here as fine speckled (AC-4) with n=5 and is not incorrectly regarded as homogeneously stained, as might be the case for the homogeneous pattern n=2 (AC-1), since, in the case of said homogeneous pattern, the metaphase plate MP would have to be significantly stained. Similarly, pattern staining of the type "dense fine speckled" with n=4 (AC-2) can be ruled out here, since, in the case of this fluorescence pattern type, the meta-phase plate MP of the mitosis cell MZY would have to be significantly stained.

It thereby becomes apparent again here that the method according to the invention, in which sub-images are selected depending on whether they comprise image segments having at least one valid mitotic cell in a metaphase stage, allows a particularly high quality of detection of different fluorescence pattern types.

As already explained above, the segmentation of the total image to determine the segmented image is preferably done by means of a network separate from the hitherto mentioned convolutional neural network, especially by means of a further separate and pretrained convolutional neural network. Classic image-processing methods, for example Otsu's thresholding method, are effective only to a limited extent.

Figure 21A:
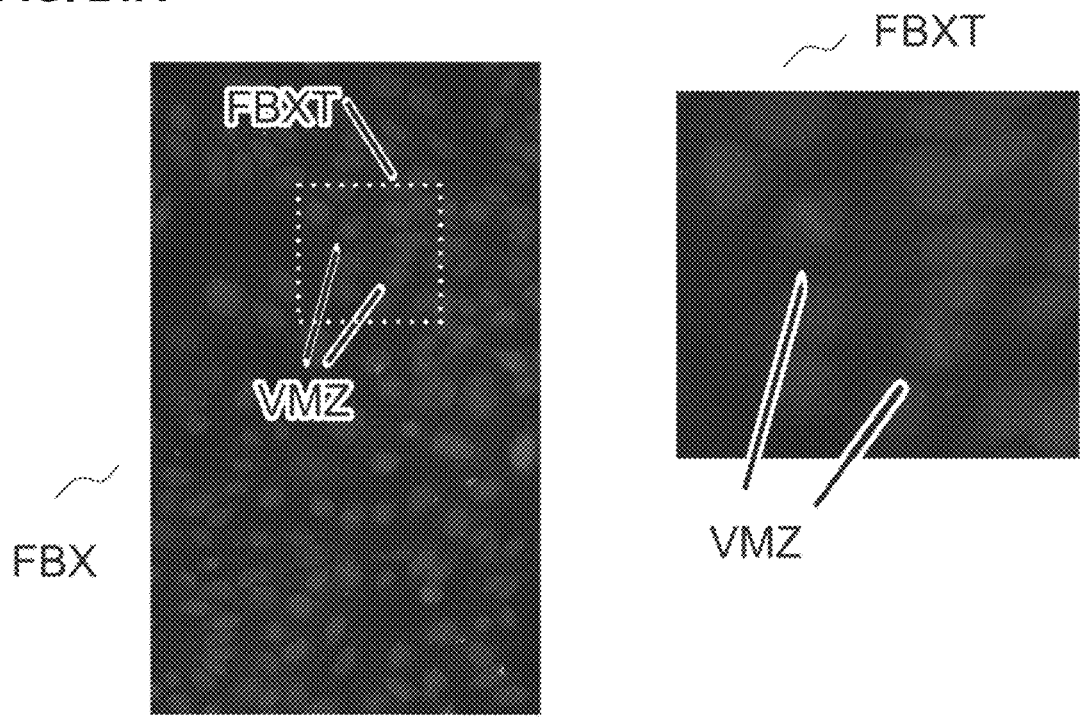
FIG. 21A shows a fluorescence image comprising valid mitosis cells.
Figure 21B:
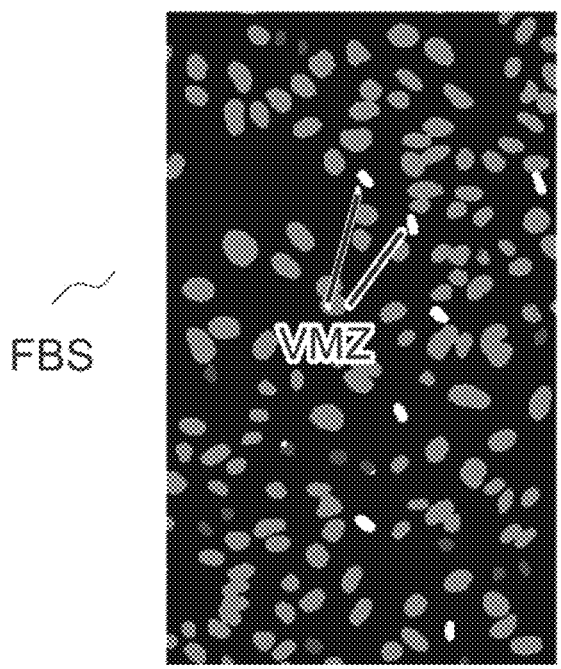
FIG. 21B shows a segmentation result relating to the fluorescence image from FIG. 21A.

For illustration, FIG. 21A shows a fluorescence image FBX comprising, in a sub-region FBXT, two valid mitosis cells VMZ, which are in particular in a valid mitosis stage and show a metaphase plate. As already explained above, such mitosis cells must be reliably identified in the segmentation step. Because of the staining of the metaphase plate that differs only very slightly compared to other regions such as, for example, the cytoplasm, reliable detection of said cells VMZ by means of a thresholding method is difficult. FIG. 21B shows a segmentation result FBS following the method proposed here, by means of a convolutional neural network, which has detected the valid mitosis cells or the metaphase plates thereof very well as white regions. It is thus clear that the use of a convolutional neural network for the task of segmentation has distinct advantages over classic image-processing methods.

The method according to the invention has been described here by acquisition of the total image in a step SC2 from FIG. 1. Therefore, what is precisely proposed is a method for detecting respective potential presences of respective different cellular fluorescence pattern types on a biological cellular substrate comprising human epithelioma cells by means of digital image processing, which method starts with the step of acquisition of the total image.

As an alternative to step SC2 of acquisition of the total image, what can also be carried out correspondingly and analogously is a method for digital image processing, in which such a total image in the form of data is provided or received in a corresponding step. What are then further carried out in the method of digital image processing are the further steps SC2A, SC3, SC4, SC5.

Figure 7A:
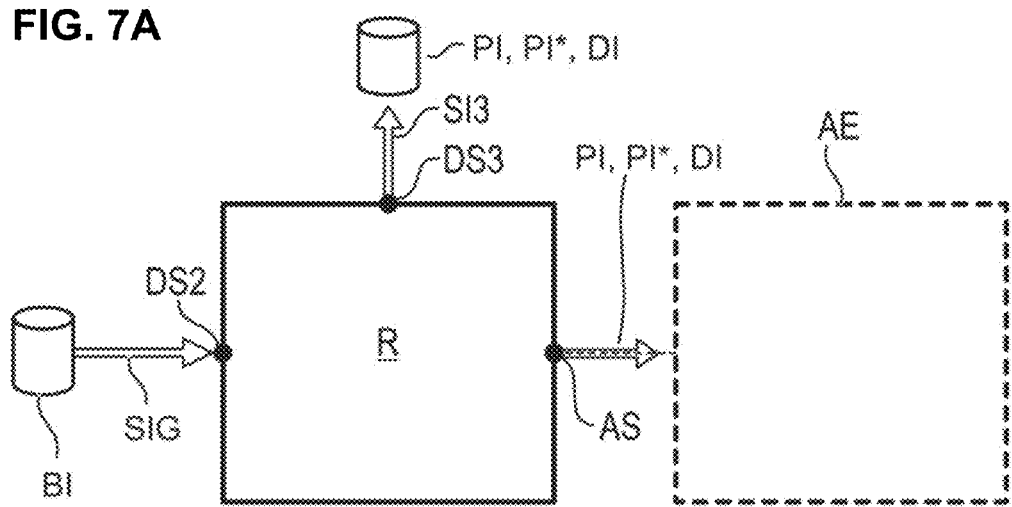
FIG. 7A shows a proposed computing unit as per a preferred embodiment.

In relation to this, FIG. 7A shows a proposed computing unit R, which receives a relevant image B or image information BI in the form of a data signal SIG via an interface DS2. The computing unit R can the preferably output the ascertained measures of confidence PI, the verified measures of confidence PI* and/or the detection information DI, especially to a display unit AE, via an output interface AS.

These items of information can preferably also be output in the form of a signal SI3 via a data interface DS3 in the form of a data network interface.

Figure 7B:
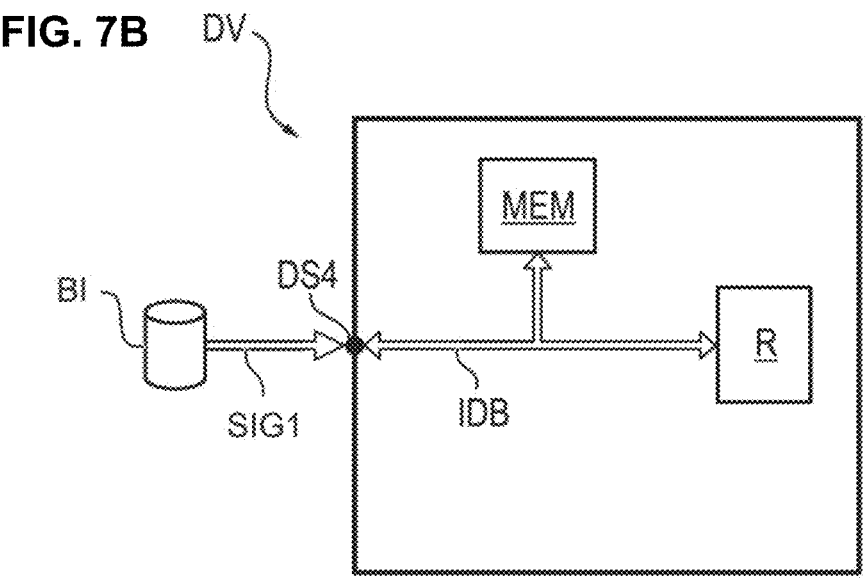
FIG. 7B shows a proposed data network device as per a preferred embodiment.

In addition to this, FIG. 7B shows a proposed data network device which receives the image or the image information BI via an interface DS4 and a relevant data signal SIG1. The data network device preferably further comprises an internal data bus IDB, which connects an above-described computing unit R to preferably a storage unit MEM.

Figure 7C:
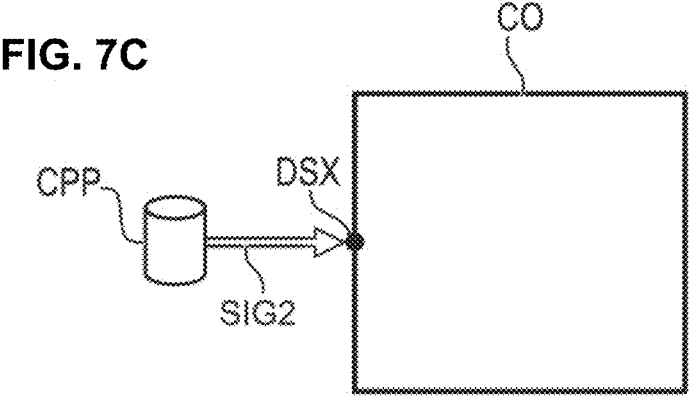
FIG. 7C shows a proposed computer program product and a data carrier signal as per a preferred embodiment.

FIG. 7C illustrates a proposed computer program product CPP comprising commands which, upon execution of the program by a computer, prompt said computer to carry out the proposed method for digital image processing. Said computer program product can, for example, be provided or transmitted via a data signal SIG2 in the proposed manner. This transmission can be effected towards a computer CO or to a data interface DSX of the computer CO.

FIG. 6 illustrates one exemplary embodiment of the apparatus V1 according to the invention. The apparatus V1 comprises a holding device HL for the substrate SU. Excitation light AL of an excitation light source LQ is pre-filtered via an optical filter F1 and then guided through an optical system 0 towards the substrate by means of a dichroic mirror SP1. Resultant fluorescence radiation or resultant fluorescence light FL then passes back through the objective 0 from the substrate SU and through the dichroic mirror SP1 and through an optical filter F2. The optical filter F2 filters out a wavelength of the excitation radiation or the excitation light AL. The fluorescence light FL is then supplied to an image acquisition unit in the form of a camera K. It is via an optical filter FG allowing transmission of the fluorescence radiation in a preferably green color channel that the fluorescence light FL is supplied to the image acquisition unit K. The image acquisition unit K acquires the fluorescence image or the total image.

A computing unit R is designed to receive the fluorescence image in the form of digital image data BI. The computing unit R is further designed to determine a segmented image by means of segmentation of the total image, to detect in the segmented image respective image segments which each represent a mitotic cell, to select sub-images of the total image which each comprise at least one mitotic cell and corresponding sub-images of the segmented image on the basis of the detected image segments, and to detect respective actual presences of the respective cellular fluorescence pattern types by means of a convolutional neural network on the basis of the selected sub-images of the total image and the selected sub-images of the segmented image.

Via a data interface DS1, the apparatus V1 can provide a detection result in the form of detection information DI and/or presence information or prediction information PI, PI*.

Although some aspects have been described in connection with an apparatus, it is self-evident that said aspects are also a description of the corresponding methods, and so a block or a component of an apparatus can also be understood as a corresponding method step or as a feature of a method step. By analogy, aspects which have been described in connection with a method step or as a method step are also a description of a corresponding block or detail or feature of a corresponding apparatus.

Depending on particular implementation requirements, exemplary embodiments of the invention can realize the computing unit R or the data network device DV in hardware form and/or in software form. Here, realization of a presently mentioned computing unit R can be achieved as at least one computing unit or else by an association of multiple computing units. Implementation can be achieved using a digital storage medium, for example a floppy disk, a DVD, a Blu-Ray Disc, a CD, a ROM, a PROM, an EPROM, an EEPROM or a FLASH memory, a hard disk or some other magnetic or optical memory, which stores electronically readable control signals which cooperate or can cooperate with a programmable hardware component such that the method in question is carried out.

A programmable hardware component can be formed as a computing unit by a processor, a central processing unit (CPU), a computer, a computer system, an application-specific integrated circuit (ASIC), an integrated circuit (IC), a system on a chip (SOC), a programmable logic element or a field-programmable gate array with a microprocessor (FPGA).

The digital storage medium can therefore be machine-readable or computer-readable. Some exemplary embodiments thus comprise a data carrier having electronically readable control signals capable of cooperating with a programmable computer system or a programmable hardware component such that one of the methods described herein is carried out.

In general, exemplary embodiments or parts of exemplary embodiments of the present invention can be implemented as a program, firmware, computer program or computer program product containing a program code or as data, the program code or the data being effective in carrying out one of the methods or part of a method when the program runs on a processor or a programmable hardware component.

To implement one or more exemplary embodiments of the presently proposed convolutional neural network, a person skilled in the art can rely on a so-called open-source deep-learning library called "Keras". Detailed information can be found by a person skilled in the art under https://keras.io.

Example 1

The system specified or the method according to the invention was tested on 196 different patient samples; in this connection, the samples were diluted out in a linear dilution series starting from 1:100. This means that the patient samples were diluted out and incubated in a rising sequence starting from 1:100. In this case, samples were diluted in different steps from the series 1:100, 1:320, 1:1000, 1:3200, 1:10 000, 1:32 000, 1:100 000, 1:320 000, 1:1 000 000. However, the system is not in any way restricted to specified dilution series.

A pattern was declared by an expert as present based on a particular sample, if it was identified as present in some dilution or some fluorescence image based on the particular sample. The pattern did not have to be identified by the expert in all dilutions or all fluorescence images based on the particular sample in order to be declared as present.

A pattern was declared by an expert as negative (comprising no pattern) based on a particular sample, if it was identified as negative (comprising no pattern) in all dilutions or all fluorescence images based on the particular sample.

A pattern was detected by the method according to the invention as generally present based on a particular sample, if it was detected as present in some dilution or some fluorescence image based on the particular sample. The pattern did not have to be detected by the method according to the invention in all dilutions or all fluorescence images based on the particular sample in order to be detected as present in general.

A sample was detected by the method according to the invention as negative (comprising no pattern) based on a particular sample, if it was detected as negative (comprising no pattern) in all dilutions or all fluorescence images based on the particular sample.

In the case of a presence of, for example, two different patterns actually present, the two patterns were declared by an expert as both present, even if said expert identified the two patterns in different dilutions or different fluorescence images of a same sample.

In the case of a presence of, for example, two different patterns actually present, the two patterns were detected by the method according to the invention as both present, even if the method detected the two patterns in different dilutions or different fluorescence images of a same sample.

Thus, if for example the pattern homogeneous was detected in the dilution 1:100 and a different pattern was detected in a different dilution, for example 1:320, both patterns are output for this sample.

The identification rates in the table from FIG. 22 are based on an entire patient sample of all dilutions. For different patterns and in the event of a negative sample, Table 1 shows the following characteristic values in each case:
- TA: "True Acceptance": this is the number of samples in which an expert decided on "present" for this pattern in some dilution and in which the system decided on "pre-sent" for this pattern in at least one dilution.
- FA: "False Acceptance": this is the number of samples in which an expert decided on "not present" for this pattern in all dilutions and in which the system decided on "pre-sent" for this pattern in at least one dilution.
- TR: "True Rejection": this is the number of samples in which an expert decided on "not present" for this pattern in all dilutions and in which the system decided on "not pre-sent" for this pattern in all dilutions.
- FR: "False Rejection": this is the number of samples in which an expert decided on "present" for this pattern in some dilution and in which the system decided on "not pre-sent" for this pattern in at least all dilutions.
- Sens: Sensitivity of the system as absolute number.
- Spec: Specificity as absolute number.
- Overall: The combined concordance as absolute number The results are yielded by the use of the complete system, i.e. segmentation network, classification network, use of threshold values of the probabilities of the individual patterns, and use of the threshold values of the brightnesses of the individual patterns.

The convolutional neural network for identification of a presence of the patterns used altogether 95 661 sub-image tuples for the training, 71 649 thereof for the actual training and 24 012 thereof for separate validation. For the convolutional neural network for segmentation, altogether 5509 images were available for the training, 4131 thereof in the actual training set and 1378 thereof in a validation set.

Regarding the incubated substrates, 50% were substrates of the type FA 1520-0110 and 50% were substrates of the type FA 1522-0110, obtainable from EUROIMMUN Medizinische Labordiagnostika. The fluorescence images of the substrates were recorded using the instrument "EUROPattern Microscope Live".

What is claimed is:

1. A method for detecting respective potential presences of respective different cellular fluorescence pattern types on a biological cellular substrate comprising human epithelioma cells, wherein the cellular fluorescence pattern types comprise a plurality of different antinuclear antibody fluorescence pattern types, the method comprising:
   incubating the cellular substrate with a liquid patient sample which potentially comprises primary antibodies and, furthermore, with secondary antibodies which have been labelled with a fluorescent dye;
   acquiring a total image which represents staining of the cellular substrate due to the fluorescent dye;
   determining a segmented image by means of segmentation of the total image;
   detecting, in the segmented image, respective image segments wherein a respective image segment represents a respective metaphase plate of a mitosis cell in a metaphase stage,
   selecting sub-images of the total image which each comprise at least one mitotic cell and selecting corresponding sub-images of the segmented image on the basis of the detected image segments; and
   detecting respective actual presences of the respective cellular fluorescence pattern types by means of a convolutional neural network on the basis of the selected sub-images of the total image and the selected sub-images of the segmented image,
   wherein the convolutional neural network processes, in each case, a tuple of sub-images at the same time, which comprises at least one selected sub-image of the total image and a corresponding selected sub-image of the segmented image.

2. The method according to claim 1, further comprising:
   detecting in the total image, on the basis of the segmented image, respective image segments which each represent a mitotic cell of sufficient quality,
   wherein a mitotic cell is of sufficient quality when it is present in a metaphase stage of mitosis; and
   selecting sub-images of the total image and corresponding sub-images of the segmented image on the basis of the detected image segments which each represent at least one mitotic cell of sufficient quality.

3. The method according to claim 1, further comprising:
   determining respective measures of confidence for the respective actual presences of the respective fluorescence pattern types by means of the convolutional neural network on the basis of the selected sub-images of the total image and the selected sub-images of the segmented image.

4. The method according to claim 3, wherein:
   the convolutional neural network comprises an output layer which generates a respective feature map for a respective cellular fluorescence pattern type; and
   the convolutional neural network determines a respective measure of confidence on the basis of a respective feature map.

5. The method according to claim 3, further comprising:
segmenting the total image into image segments of different segment classes;
determining at least one brightness value for at least one fluorescence pattern type on the basis of one or more image segments of at least one particular segment class; and
verifying the measure of confidence of the at least one fluorescence pattern type on the basis of the brightness value of the at least one fluorescence pattern type.

6. The method according to claim 5, wherein the verification of the measure of confidence is done on the basis of the brightness value and depending on a threshold value specifiable by a user.

7. The method according to claim 3, further comprising, for a respective sub-image tuple which comprises a sub-image of the total image and a corresponding sub-image of the segmented image:
determining respective sub-image measures of confidence for respective actual sub-image presences of respective cellular fluorescence pattern types by means of the convolutional neural network; and
determining the respective measures of confidence for the respective actual presences of the respective fluorescence pattern types on the basis of the sub-image measures of confidence.

8. The method according to claim 1, further comprising
dividing the total image into a set of sub-images according to a specified division scheme;
selecting sub-images of the total image on the basis of the detected image segments and selecting corresponding sub-images of the segmented image; and
detecting respective actual presences of the respective cellular fluorescence pattern types by means of the convolutional neural network on the basis of the selected sub-images of the total image and on the basis of the selected sub-images of the segmented image.

9. An apparatus for detecting respective potential presences of respective different cellular fluorescence pattern types on a biological cellular substrate comprising human epithelioma cells by means of digital image processing, the apparatus comprising:
a holding device for the cellular substrate, which was incubated with a liquid patient sample which potentially comprises primary antibodies and, furthermore, with secondary antibodies which have been labelled with a fluorescent dye;
at least one image acquisition unit for acquiring a total image which represents staining of the cellular substrate due to the fluorescent dye; and
at least one computing unit configured to:
determine a segmented image by means of segmentation of the total image;
detect in the segmented image respective image segments, wherein a respective image segment represents a respective metaphase plate of a mitosis cell in a metaphase stage,
select sub-images of the total image which each comprise at least one mitotic cell and corresponding sub-images of the segmented image on the basis of the detected image segments; and
detect respective actual presences of the respective cellular fluorescence pattern types by means of a convolutional neural network on the basis of the selected sub-images of the total image and the selected sub-images of the segmented image,
wherein the convolutional neural network processes, in each case, a tuple of sub-images at the same time, which comprises at least one selected sub-image of the total image and a corresponding selected sub-image of the segmented image.

10. A method for detecting respective potential presences of respective different cellular fluorescence pattern types on a biological cellular substrate comprising human epithelioma cells by means of digital image processing, the method comprising:
acquiring a total image which represents staining of the cellular substrate due to the fluorescent dye;
determining a segmented image by means of segmentation of the total image;
detecting in the segmented image respective image segments, wherein a respective image segment represents a respective metaphase plate of a mitosis cell in a metaphase stage,
selecting sub-images of the total image which each comprise at least one mitotic cell and corresponding sub-images of the segmented image on the basis of the detected image segments; and
detecting respective actual presences of the respective cellular fluorescence pattern types by means of a convolutional neural network on the basis of the selected sub-images of the total image and the selected sub-images of the segmented image,
wherein the convolutional neural network processes, in each case, a tuple of sub-images at the same time, which comprises at least one selected sub-image of the total image and a corresponding selected sub-image of the segmented image.

11. A method for digital image processing comprising:
receiving a total image which represents staining of a biological cellular substrate due to a fluorescent dye, wherein the biological cellular substrate comprises human epithelioma cells, the method comprising:
determining a segmented image by means of segmentation of the total image;
detecting in the segmented image respective image segments wherein a respective image segment represents a respective metaphase plate of a mitosis cell in a metaphase stage, selecting sub-images of the total image which each comprise at least one mitotic cell and corresponding sub-images of the segmented image on the basis of the detected image segments; and
detecting respective actual presences of the respective cellular fluorescence pattern types by means of a convolutional neural network on the basis of the selected sub-images of the total image and the selected sub-images of the segmented image,
wherein the convolutional neural network processes, in each case, a tuple of sub-images at the same time, which comprises at least one selected sub-image of the total image and a corresponding selected sub-image of the segmented image.

12. A computing unit which, in the course of digital image processing, is configured to:
receive a total image which represents staining of a biological cellular substrate due to a fluorescent dye, the biological cellular substrate comprising human epithelioma cells;
determine a segmented image by means of segmentation of the total image;

detect in the segmented image respective image segments wherein a respective image segment represents a respective metaphase plate of a mitosis cell in a metaphase stage,
  select sub-images of the total image which each comprise at least one mitotic cell and corresponding sub-images of the segmented image on the basis of the detected image segments; and
detect respective actual presences of the respective cellular fluorescence pattern types by means of a convolutional neural network on the basis of the selected sub-images of the total image and the selected sub-images of the segmented image,
wherein the convolutional neural network processes, in each case, a tuple of sub-images at the same time, which comprises at least one selected sub-image of the total image and a corresponding selected sub-image of the segmented image.

13. The computing unit according to claim 12, wherein the computing unit comprises a data network device having at least one data interface for receiving the total image.

\* \* \* \* \*